United States Patent
Peana et al.

(10) Patent No.: US 10,684,507 B2
(45) Date of Patent: Jun. 16, 2020

(54) SYSTEM AND METHOD OF CONTROLLING LIGHT EMISSIONS OF DISPLAYS

(71) Applicant: Dell Products L.P., Round Rock, TX (US)

(72) Inventors: Stefan Peana, Austin, TX (US); Asim M. Siddiqui, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 110 days.

(21) Appl. No.: 15/925,475

(22) Filed: Mar. 19, 2018

(65) Prior Publication Data

US 2019/0285948 A1    Sep. 19, 2019

(51) Int. Cl.
*G02F 1/133* (2006.01)
*G09G 3/34* (2006.01)
*G02F 1/13357* (2006.01)

(52) U.S. Cl.
CPC .. *G02F 1/133606* (2013.01); *G02F 1/133603* (2013.01); *G02F 1/133611* (2013.01); *G09G 3/3406* (2013.01); *G09G 3/3426* (2013.01)

(58) Field of Classification Search
CPC ............ G02F 1/133603; G02F 1/1323; G02F 1/1393; G02F 1/133634; G02F 1/133504; G02F 1/1334; G02F 1/133606; G09G 3/3426; G09G 3/3406; G06F 21/84;
(Continued)

(56) References Cited

U.S. PATENT DOCUMENTS

| 4,788,094 A | 11/1988 | Morita et al. |
| 4,853,769 A | 8/1989 | Kollin |
| 7,817,361 B2 | 10/2010 | Mimura et al. |

(Continued)

FOREIGN PATENT DOCUMENTS

JP    2007272065    10/2007

OTHER PUBLICATIONS

Berger, Stefan, et al. "Using symbiotic displays to view sensitive information in public." *Pervasive Computing and Communications, 2005. PerCom 2005. Third IEEE International Conference on.* IEEE, 2005; 10 pages.

(Continued)

*Primary Examiner* — Xuemei Zheng
(74) *Attorney, Agent, or Firm* — Baker Botts L.L.P.

(57) ABSTRACT

In one or more embodiments, one or more systems, methods, and/or processes may receive first configuration information; may activate, based at least on the first configuration information, first backlight segments; may generate, via the first backlight segments, first light emissions; may direct, via first louvers, the first light emissions at a first angle with respect to a surface of a display; may deactivate the first backlight segments; may receive second configuration information; may activate, based at least on the second configuration information, second backlight segments of the display, where at least a portion of the second backlight segments is different from at least a portion of the first backlight segments; may generate, via the second backlight segments, second light emissions; and may direct, via second louvers, the second light emissions at a second angle, different from the first angle, with respect to the surface of the display.

15 Claims, 17 Drawing Sheets

(58) Field of Classification Search
CPC ...... G06F 21/10; G06F 21/6245; G06F 21/60; G06F 21/32; G06F 21/44
See application file for complete search history.

(56) References Cited

U.S. PATENT DOCUMENTS

| | | |
|---|---|---|
| 7,973,749 B2 | 7/2011 | Uehara et al. |
| 8,213,082 B2 | 7/2012 | Gaides et al. |
| 8,289,458 B2 | 10/2012 | Walton et al. |
| 8,503,122 B2 | 8/2013 | Liu et al. |
| 8,917,267 B2 | 12/2014 | Miyasaka et al. |
| 8,922,480 B1 | 12/2014 | Freed et al. |
| 9,229,253 B2 | 1/2016 | Schwartz et al. |
| 10,013,947 B2 | 7/2018 | Ek et al. |
| 10,204,592 B1 | 2/2019 | Trim et al. |
| 10,247,982 B2 | 4/2019 | Choi et al. |
| 10,283,082 B1 | 5/2019 | Gassner |
| 10,288,938 B2 * | 5/2019 | Chu ................ G02F 1/133603 |
| 2005/0219445 A1 | 10/2005 | Kubo |
| 2006/0012879 A1 | 1/2006 | Johnson et al. |
| 2006/0238664 A1 | 10/2006 | Uehara et al. |
| 2007/0222915 A1 | 9/2007 | Niioka et al. |
| 2009/0153783 A1 | 6/2009 | Umemoto |
| 2010/0017906 A1 | 1/2010 | Albertsen et al. |
| 2012/0154885 A1 | 6/2012 | Jones et al. |
| 2013/0103943 A1 | 4/2013 | Hirsch et al. |
| 2013/0201573 A1 | 8/2013 | Shiota |
| 2014/0056028 A1 | 2/2014 | Nichol et al. |
| 2014/0204464 A1 | 7/2014 | Halverson et al. |
| 2015/0319280 A1 | 11/2015 | Gardenfors et al. |
| 2016/0062114 A1 | 3/2016 | Amarilio et al. |
| 2016/0225343 A1 | 8/2016 | Ek et al. |
| 2016/0334898 A1 | 11/2016 | Kwak et al. |
| 2016/0356943 A1 | 12/2016 | Choi et al. |
| 2017/0116425 A1 | 4/2017 | Chang |
| 2017/0175976 A1 | 6/2017 | Johnson et al. |
| 2017/0219859 A1 * | 8/2017 | Christophy ........... G02F 1/1323 |
| 2017/0371077 A1 | 12/2017 | Okamoto |
| 2018/0149772 A1 | 5/2018 | Eo et al. |
| 2018/0321431 A1 | 11/2018 | Kim et al. |

OTHER PUBLICATIONS

3M. "Advanced Solutions for Light Enhancement, Control and Protection." 3M Mobile Interative Solutions Division, 2011; 6 pages.

A. Lee et al., "6.2: Integrated TFT-LCD Timing Controllers With RSDS Column Driver Interface", Interface Products, National Semiconductor Corporation, 5 pages, 2011.

Ko-Wei Chien et al., "Polarized Backlight Based on Selective Total Internal Reflection at Microgrooves", Applied Optics/vol. 43, No. 24/Aug. 20, 2004, 5 pages.

* cited by examiner

SYSTEM AND METHOD OF CONTROLLING LIGHT EMISSIONS OF DISPLAYS

BACKGROUND

Field of the Disclosure

This disclosure relates generally to information handling systems and more particularly to privacy for displays associated with information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may receive first configuration information; may activate, based at least on the first configuration information, first backlight segments; may generate, via the first backlight segments, first light emissions; may direct, via first louvers, the first light emissions at a first angle with respect to a surface of the display; may deactivate the first backlight segments; may receive second configuration information; may activate, based at least on the second configuration information, second backlight segments of the display, where at least a portion of the second backlight segments is different from at least a portion of the first the backlight segments; may generate, via the second backlight segments, second light emissions; and may direct, via second louvers, the second light emissions at a second angle, different from the first angle, with respect to the surface of the display. In one or more embodiments, at least a portion of the second louvers may be different from at least a portion of the first louvers. In one or more embodiments, receiving the first configuration information may include receiving the first configuration information from at least one of an application and an operating system. For example, the at least one of the application and the operating system may include the application. For instance, the application may determine the first configuration information based at least on content accessed and/or received by the application. In one or more embodiments, activating the first backlight segments of the display may include: a timing controller receiving an image from a graphics processing unit, and the timing controller activating the first backlight segments. In one or more embodiments, the first light emissions may approximate an asymmetrical intensity curve. For example, a position of a user may be determined. For instance, the user may not be centered upon the display or a privacy area, and an asymmetrical intensity curve may be utilized with the privacy area based at least on the user not being centered upon the display or the privacy area.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
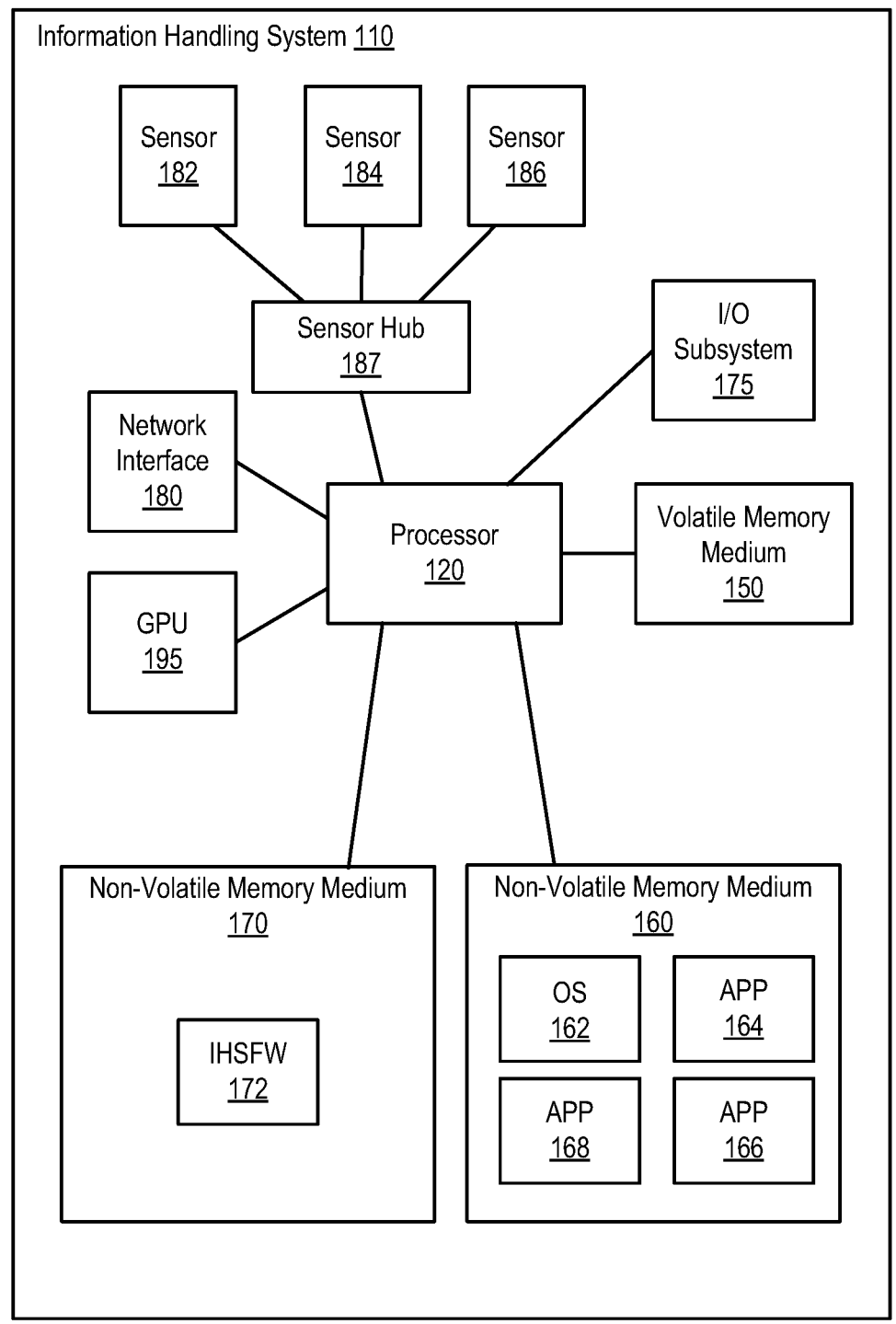
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a display device may be utilized via various orientations and/or angles. In one example, the display device may be rotated by ninety degrees. For instance, the display device may be rotated from a landscape orientation to a portrait orientation. In another example, the display device may be rotated by one hundred and eighty degrees. For instance, the display device may be associated with a laptop that includes tablet-like features.

In one or more embodiments, one or more privacy filters may include tiny blinds called micro louvers, which may be built into the one or more privacy filters. In one example, the one or more privacy filters may allow light emissions to pass straight on through but not sideways. For instance, the one or more privacy filters may block or obscure the light emissions at an angle greater than thirty degrees on either side of a screen or display device. In another example, the one or more privacy filters may steer and/or direct light emissions. For instance, the one or more privacy filters may direct the light emissions at an angle with respect to a screen or display device. In one or more embodiments, the one or more privacy filters may allow a user of an information handling system to see what is on the screen or display device, and any bystander's view of content, via the light emissions, may be blocked or obscured when viewing the screen or display device outside of a viewing region (e.g., greater than thirty degrees on either side of the screen or display device). For example, the one or more privacy filters may be controllable by the user. For instance, the one or more privacy filters may be turned on or off based on input from the user.

In one or more embodiments, a display privacy solution may be implemented via a global backlight that provides illumination through a display stack that results in preset physical privacy window. For example, this integrated privacy solution may utilize reflective polarizers to improve backlight efficiency by reflecting a polarization state that would be absorbed. For instance, this solution may utilize one or more predetermined angles, which may or may not be changed by a user. In one or more embodiments, a display privacy solution may be implemented via backlight segments. For example, illumination of each of the backlight segments may be controlled. In one or more embodiments, a display privacy solution may include backlight segments and louvers. In one example, the louvers may provide a privacy area of the display. For instance, the louvers may direct and/or obscure light emissions associated with one or more angles. In another example, the backlight segments may control illumination to the privacy area of the display and to a non-privacy area of the display. In one or more embodiments, utilizing backlight segments and louvers may produce an area of a display with a size attribute and angular distribution of light emissions. In one or more embodiments, a timing controller (TCON) may be utilized to control the backlight segments. For example, the TCON may utilize one or more methods and/or one or more processes that control the backlight segments. In one or more embodiments, an application may receive input (e.g., user input, configuration input, etc.). For example, the application may provide the input to the TCON. For instance, the TCON may control the backlight segments in accordance with the input.

In one or more embodiments, privacy of information conveyed via the display device may be conveyed after the display device is rotated. For example, the display device may include a switchable diffuser that is configured to provide privacy of information conveyed via the display device after the display device is rotated and/or after an orientation of the display device is changed. For instance, the switchable diffuser that is configured to provide privacy of information conveyed via the display device may provide privacy protection associated with left side and/or right side intrusions and may continue to provide privacy protection associated with left-side and/or right-side intrusions after the display device is rotated and/or after an orientation of the display device is changed. In one or more embodiments, privacy of information conveyed via the display device may be associated with a top down and/or bottom up intrusions. In one example, a person looking down on the display device may not be able to decipher information conveyed via the display device. In another example, the display device may be on or within a horizontal surface (e.g., a surface of a table, a desk, a counter, etc.), and a person looking towards a top of the display device may not be able to decipher information conveyed via the display device.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, Hyper-Transport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, sensors 182-186, a sensor hub 187, and a graphics processing unit (GPU) 195. As illustrated, volatile memory medium 150, non-volatile memory media 160 and 170, I/O subsystem 175, network interface 180, sensor hub 187, and GPU 195 may be communicatively coupled to processor 120. In one or more embodiments, sensors 182-186 may be communicatively coupled to processor 120 via sensor hub 187. In one example, sensor hub 187 may be a discrete sensor hub. In another example, sensor hub 187 may be an integrated sensor hub. For instance, sensor hub may be integrated into a system on chip that includes processor 120. In one or more embodiments, one or more of sensors 182-186 may include one or more of a thermistor, a Hall effect sensor, an accelerometer, and a gyroscope, among other sensors. For example, the Hall effect sensor may be utilized in determining an opening and/or a closing of a lid of a laptop IHS.

In one or more embodiments, one or more of volatile memory medium 150, non-volatile memory media 160 and 170, I/O subsystem 175, network interface 180, and GPU 195 may be communicatively coupled to processor 120 via one or more buses, one or more switches, and/or one or more root complexes, among others. In one example, one or more of volatile memory medium 150, non-volatile memory media 160 and 170, I/O subsystem 175, network, interface 180, and GPU 195 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 1B:
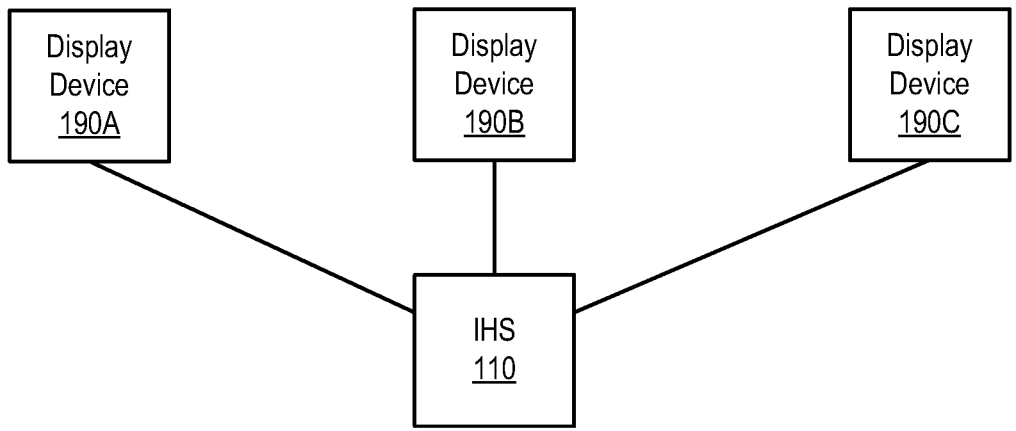
FIG. 1B illustrates an example of an information handling system coupled to one or more display devices, according to one or more embodiments.

Turning now to FIG. 1B, an example of an information handling system coupled to one or more display devices is illustrated, according to one or more embodiments. As shown, IHS 110 may be coupled to one or more of display devices 190A-190C.

Figure 1C:
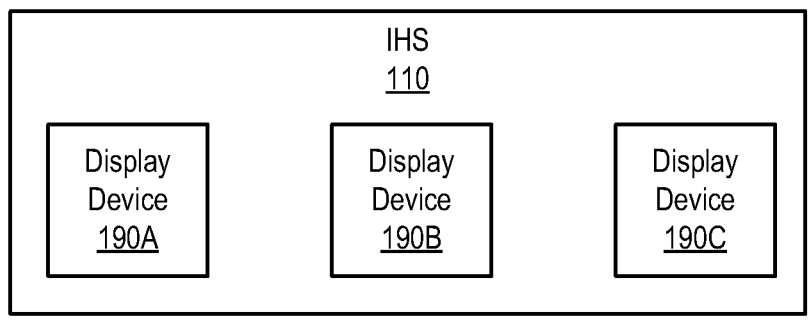
FIG. 1C illustrates an example of an information handling system that includes one or more display devices, according to one or more embodiments.

Turning now to FIG. 1C, an example of an information handling system that includes one or more display devices is illustrated, according to one or more embodiments. As shown, IHS 110 may include one or more of display devices 190A-190C.

Figure 2A:
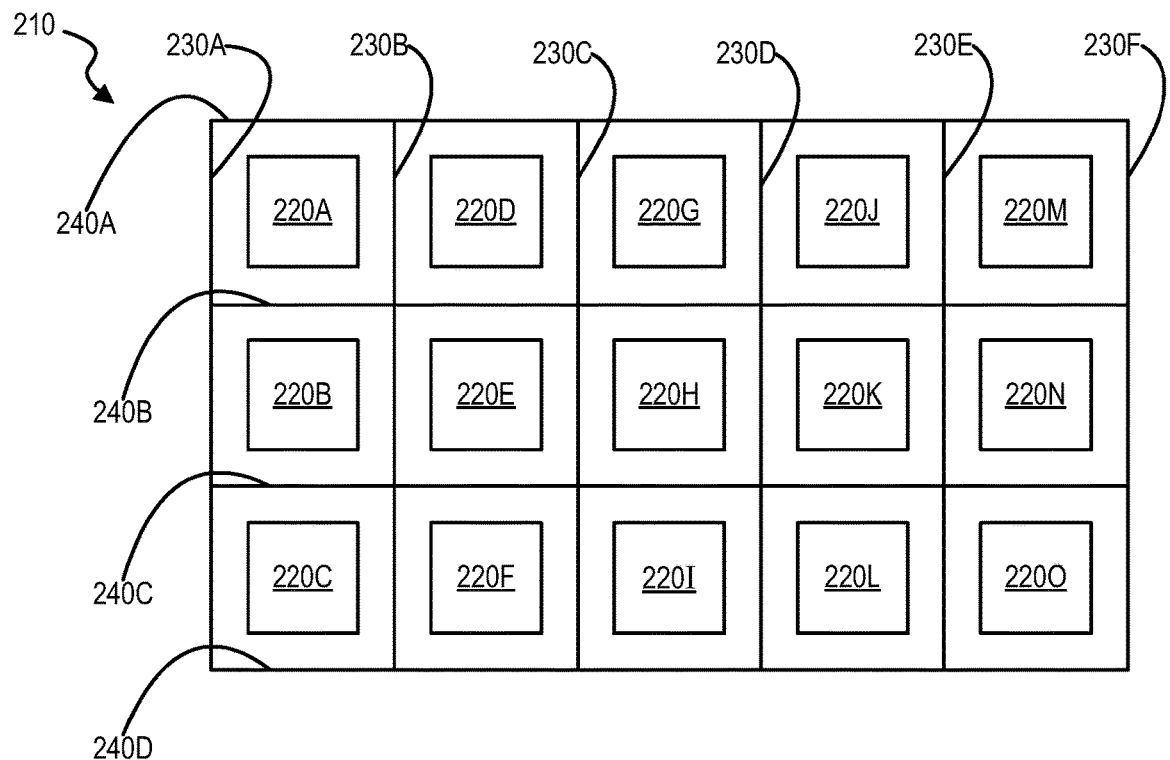
FIG. 2A illustrates an example of a portion of a display device, according to one or more embodiments.

Turning now to FIG. 2A, an example of a portion of a display device is illustrated, according to one or more embodiments. As shown, a display portion 210 may include pixels 220A-220O. In one or more embodiments, pixel 220 may be or include a physical point in an image displayed by display device 190. For example, pixel 220 may be or include a smallest controllable element of an image represented via display device 190. For instance, display device 190 may convey information via pixels 220. In one or more embodiments, display device 190 may emit light via pixels 220. For example, display device 190 may emit different colors of light via pixels 220. In one instance, pixel 220 may emit a single color. In another instance, pixel 220 may emit light at an intensity.

As shown, display portion 210 may include louvers 230A-230D and 240A-240D. In one or more embodiments, each of louver 230 and louver 240 may be or include a strip that has a height. Although not specifically illustrated, one or more of louvers 230 and 240 may extend into another display portion, according to one or more embodiments.

In one or more embodiments, one or more of louver 230 and louver 240 may include non-cubic crystal structures. In one example, the non-cubic crystal structures may restrict light emissions of display device 190. For instance, the non-cubic crystal structures may be utilized in absorbing and/or diffusing at least a portion of light emissions of display device 190. In another example, one or more of louver 230 and louver 240 may include liquid crystals. In one instance, the liquid crystals may be utilized in absorbing and/or diffusing at least a portion of light emissions of display device 190. In another instance, the liquid crystals may be utilized in steering and/or directing at least a portion of light emissions of display device 190.

In one or more embodiments, one or more of louver 230 and louver 240 may include polymer dispersed liquid crystals (PDLC). For example, the PDLC of a louver may restrict and/or direct light emissions of display device 190. In one or more embodiments, when no voltage (e.g., zero voltage) is applied to the PDLC of one or more of louver 230 and louver 240, the liquid crystals of the PDLC may be randomly arranged, which may scatter light emissions of display device 190. For example, the PDLC of one or more of louver 230 and louver 240 may absorb and/or diffuse at least a portion of light emissions of display device 190. In one or more embodiments, one or more voltages, greater than a zero voltage, may be applied to one or more of louver 230 and louver 240. For example, when applying the one or more voltages, greater than a zero voltage, to one or more of louver 230 and louver 240, an electrical current may pass through the PDLC, which may align crystals of the PDLC along parallel axes that may permit light emissions of display device 190 to pass through and/or be directed. In one instance, one or more degrees of transparency of light emissions of display device 190 may be associated with respective the one or more applied voltages to one or more of louver 230 and louver 240. In another instance, one or more degrees of steering and/or directing light emissions of display device 190 may be associated with respective the one or more applied voltages to one or more of louver 230 and louver 240. In one or more embodiments, lower voltages applied to one or more of louver 230 and louver 240 may align a few liquid crystals of the PDLC, which may permit a small portion of light emissions of display device 190. In one or more embodiments, as voltages applied to one or more of louver 230 and louver 240 increase, fewer of the liquid crystals of the PDLC may be out of alignment, which may permit an increase in permitted light emissions of display device 190. In one example, one or more voltages applied to one or more of louver 230 and louver 240 may be utilized to control one or more amounts of light emissions of display device 190. In another example, one or more voltages applied to one or more of louver 230 and louver 240 may be utilized to control one or more directions of light emissions of display device 190.

Figure 2B:
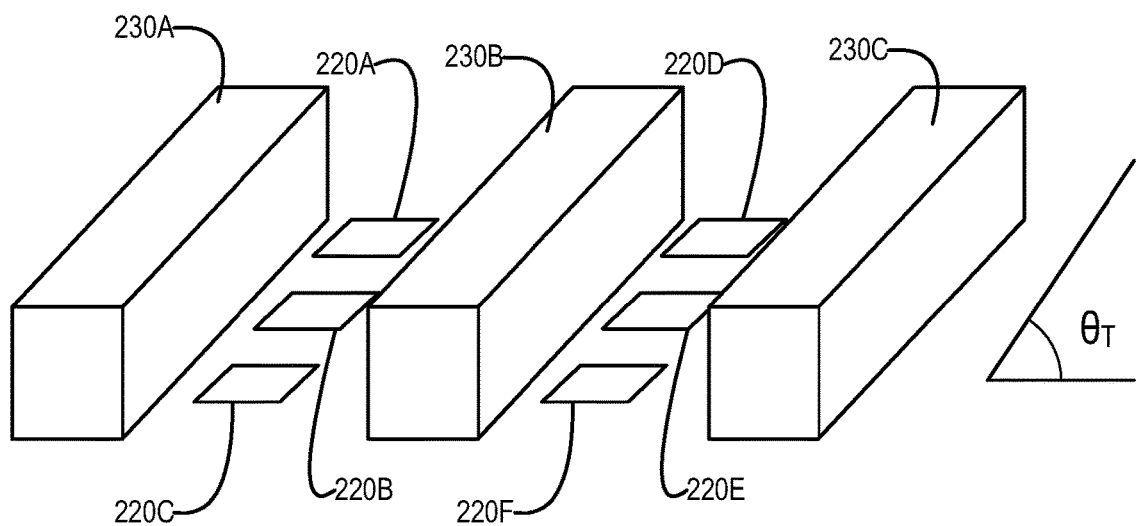
FIG. 2B illustrates an example of louvers of a display device, according to one or more embodiments.

Turning now to FIG. 2B, an example of louvers of a display device is illustrated, according to one or more embodiments. As shown, louvers 230A and 230B may have a height. In one or more embodiments, louvers 230A and 230B may have a height above pixels 220A-220C. As illustrated, louver 230C may have a height. In one or more embodiments, louvers 230B and 230C may have a height above pixels 220D-220F.

In one or more embodiments, a threshold angle may be associated with louvers 230 when louvers 230 absorb and/or diffuse at least a portion of light emissions of display device 190. For example, at least a portion of light emissions of display device 190 may be absorbed and/or diffused by louvers 230 when a viewing angle is less than the threshold angle $\theta_T$ or greater than 180-$\theta_T$. In one instance, information conveyed via pixels 220 may not be decipherable by a person when louvers 230 absorb and/or diffuse at least a portion of light emissions of display device 190 and a viewing angle is less than the threshold angle $\theta_T$ or greater than 180-$\theta_T$. In another instance, information conveyed via pixels 220 may be decipherable by a person when a viewing angle is greater than the threshold angle $\theta_T$ and less than 180-$\theta_T$.

Figure 2C:
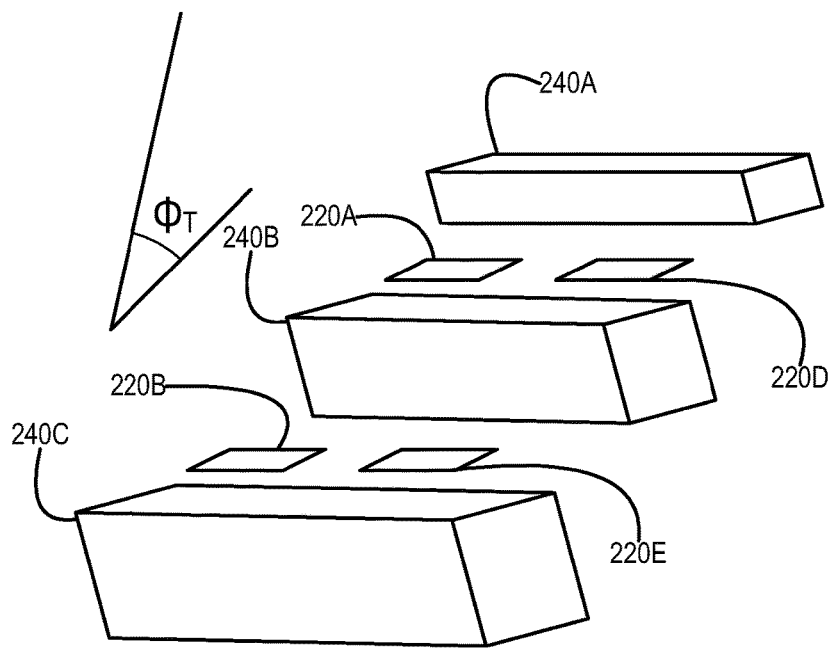
FIG. 2C illustrates another example of louvers of a display device, according to one or more embodiments.

Turning now to FIG. 2C, another example of louvers of a display device is illustrated, according to one or more embodiments. As shown, louvers 240A and 240B may have a height. In one or more embodiments, louvers 240A and 240B may have a height above pixels 220A and 220D. As illustrated, louver 240C may have a height. In one or more embodiments, louvers 240B and 240C may have a height above pixels 220B and 220E.

In one or more embodiments, a threshold angle may be associated with louvers 240 when louvers 240 absorb and/or diffuse at least a portion of light emissions of display device 190. For example, at least a portion of light emissions of display device 190 may be absorbed and/or diffused by louvers 240 when a viewing angle is less than the threshold angle $\phi_T$ or greater than 180-$\phi_T$. In one instance, information conveyed via pixels 220 may not be decipherable by a person when louvers 240 absorb and/or diffuse at least a portion of light emissions of display device 190 and a viewing angle is less than the threshold angle $\phi_T$ or greater than 180-$\phi_T$. In another instance, information conveyed via pixels 220 may be decipherable by a person when a viewing angle is greater than the threshold angle $\phi_T$ and less than 180-$\phi_T$.

In one or more embodiments, louvers 230 and louvers 240 may be stacked. In one example, louvers 230 may be stacked on louvers 240. In another example, louvers 240 may be stacked on louvers 230. In one or more embodiments, louvers 230 and louvers 240 may form an anisotropic material. In one or more embodiments, an anisotropic material may include louvers 230 and louvers 240. In one or more embodiments, a filter may include louvers 230 and louvers 240. In one example, the filter may obscure and/or block information, via light emissions of a display device, at one or more viewing angles. In another example, the filter may permit and/or allow information, via light emissions of a display device, at one or more viewing angles.

Figure 2D:
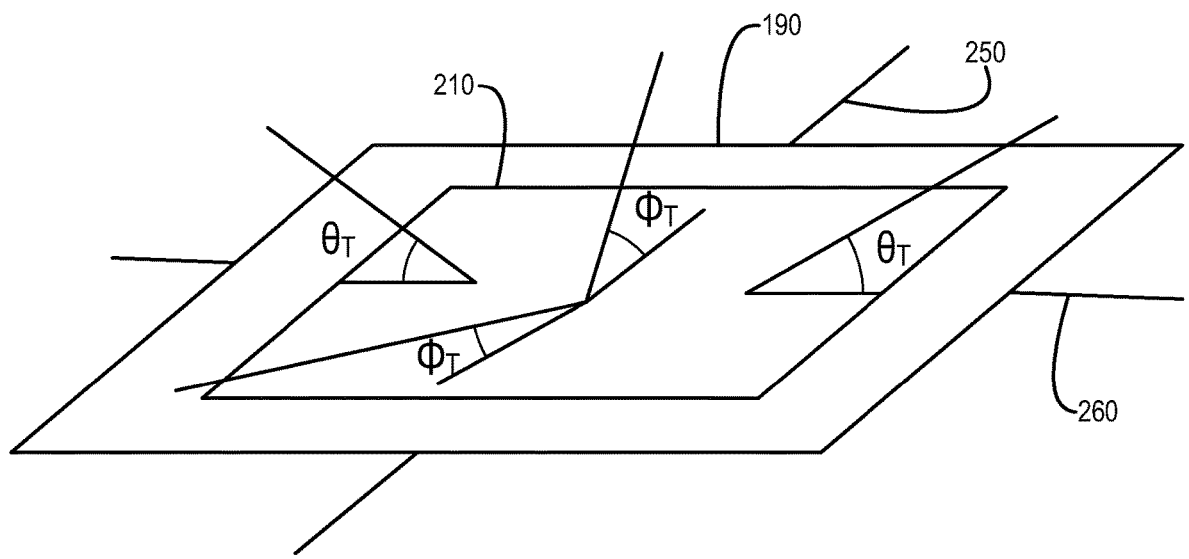
FIG. 2D illustrates an example of threshold angles of a display device, according to one or more embodiments.

Turning now to FIG. 2D, an example of threshold angles of a display device is illustrated, according to one or more embodiments. As shown, display device 190 may include display portion 210. In one or more embodiments, display device 190 may include other display portions 210. For example, display portion 210 may be for example and/or for illustrative purposes and may not actually exist within display device 190. As illustrated, the threshold angle $\phi_T$ or may be with reference to an axis 250, and the threshold angle $\theta_T$ may be with reference to an axis 260.

Figure 2E:
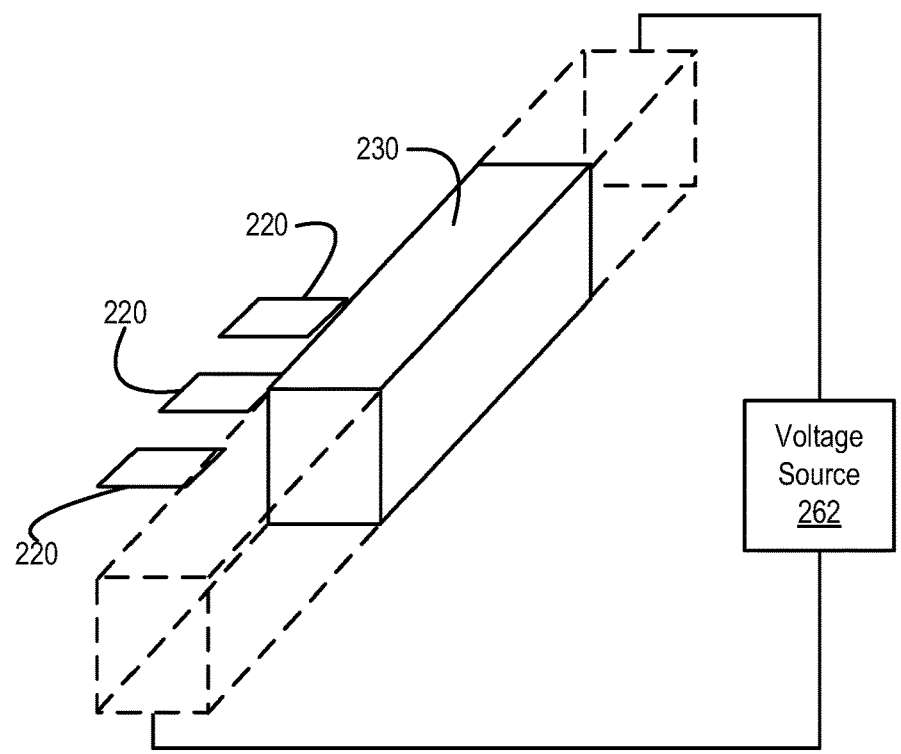
FIGS. 2E and 2F illustrate examples of voltage sources applied to louvers, according to one or more embodiments.
Figure 2F:
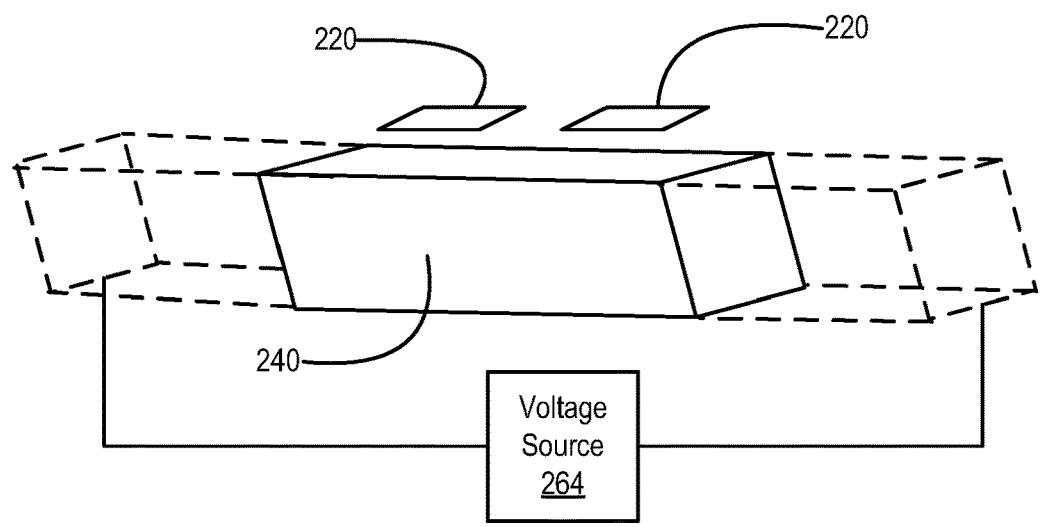

Turning now to FIGS. 2E and 2F, examples of voltage sources applied to louvers are illustrated, according to one or more embodiments. As shown in FIG. 2E, a voltage source 262 may apply a voltage to louver 230. The dashed sections of louver 230 indicate that louver 230 may be of any length. In one or more embodiments, voltage source 262 may apply a voltage to multiple louvers 230. For example, applying a voltage to multiple louvers 230 may actuate and/or engage louvers 230 such that louvers 230 may absorb, diffuse, and/or obscure at least a portion of light emissions of display device 190 and a viewing angle is less than the threshold angle $\theta_T$ or greater than 180-$\theta_T$ with respect to axis 260. For instance, a person may not be able to decipher information conveyed from display device 190 when a viewing angle is less than the threshold angle $\theta_T$ or greater than 180-$\theta_T$ with respect to axis 260 when a voltage from voltage source 262 is applied to louvers 230. In another example, information conveyed via pixels 220 may be decipherable by a person when a viewing angle is greater than the threshold angle $\theta_T$ and less than 180-$\theta_T$ with respect to axis 260 when a voltage is not applied to louvers 230.

As illustrated in FIG. 2F, a voltage source 264 may apply a voltage to louver 240. The dashed sections of louver 230 indicate that louver 240 may be of any length. In one or more embodiments, voltage source 264 may apply a voltage to multiple louvers 240. In one example, applying a voltage to multiple louvers 240 may actuate and/or engage louvers 240 such that louvers 240 may absorb, diffuse, and/or obscure at least a portion of light emissions of display device 190 and a viewing angle is less than the threshold angle $\phi_T$ or greater than 180-$\phi_T$ with respect to axis 250. For instance, a person may not be able to decipher information conveyed from display device 190 when a viewing angle is less than the threshold angle $\phi_T$ or greater than 180-$\phi_T$ with respect to axis 250 when a voltage from voltage source 264 is applied to louvers 240. In another example, information conveyed via pixels 220 may be decipherable by a person when a viewing angle is greater than the threshold angle $\phi_T$ and less than 180-$\phi_T$ with respect to axis 250 when a voltage is not applied to louvers 240. In one or more embodiments, one or more of voltage sources 262 and 264 may be controlled via one or more of processor 120 and an embedded controller 510 (described further below), among others.

Figure 2G:
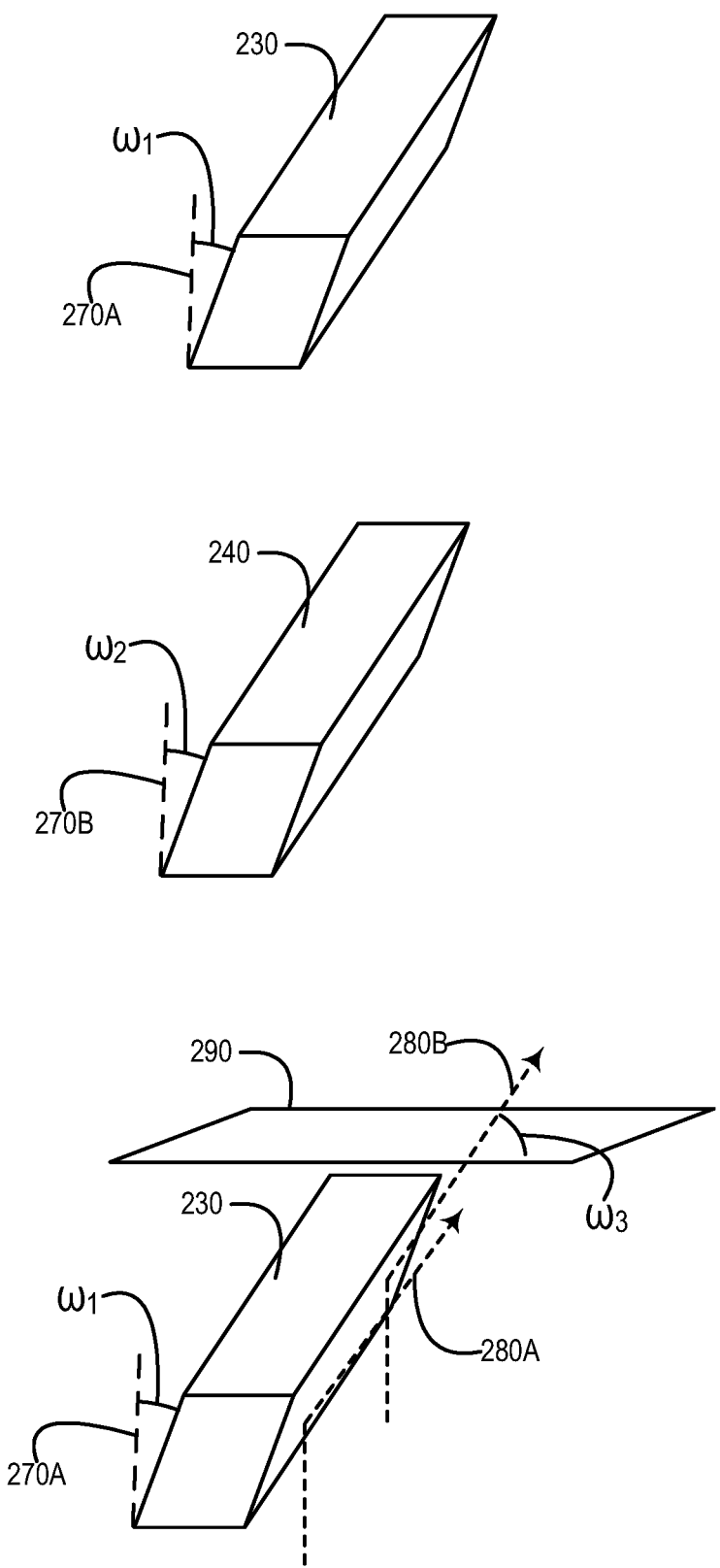
FIGS. 2G illustrates examples of louvers at angles, according to one or more embodiments.

Turning now to FIG. 2G, examples of louvers at angles are illustrated, according to one or more embodiments. As shown, a louver 230 may be at an angle $\omega_1$ with respect to a vertical line and/or axis 270A. As illustrated, a louver 240 may be at an angle $\omega_2$ with respect to a vertical line and/or axis 270B. In one or more embodiments, a louver at an angle with respect to an axis may be utilized in directing and/or steering light emissions. In one example, a louver 230 may be at an angle $\omega_1$ with respect to a vertical line and/or axis 270A may be utilized in directing and/or steering light emissions at or associated with a first angle with respect to a surface display 190. In another example, a louver 240 may be at an angle $\omega_2$ with respect to a vertical line and/or axis 270B may be utilized in directing and/or steering light emissions at or associated with a first angle with respect to a surface of display 190. As illustrated, louver 230 may be at angle $\omega_1$ with respect to vertical line and/or axis 270A may be utilized in directing and/or steering light emissions 280 at or associated with an angle $\omega_3$ with respect to a surface 290 of display 190.

Figure 2H:
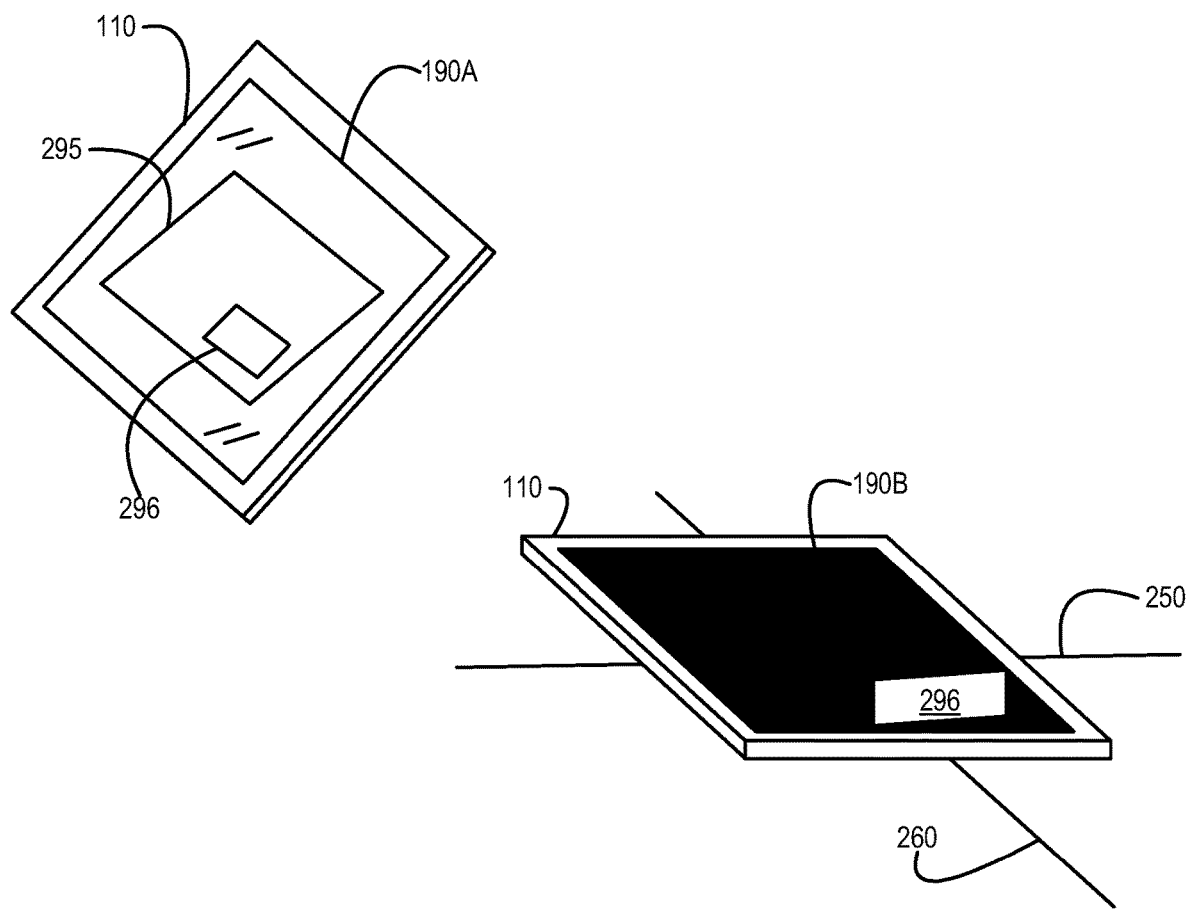
FIG. 2H illustrates an example of a privacy area, according to one or more embodiments
Figure 2H:
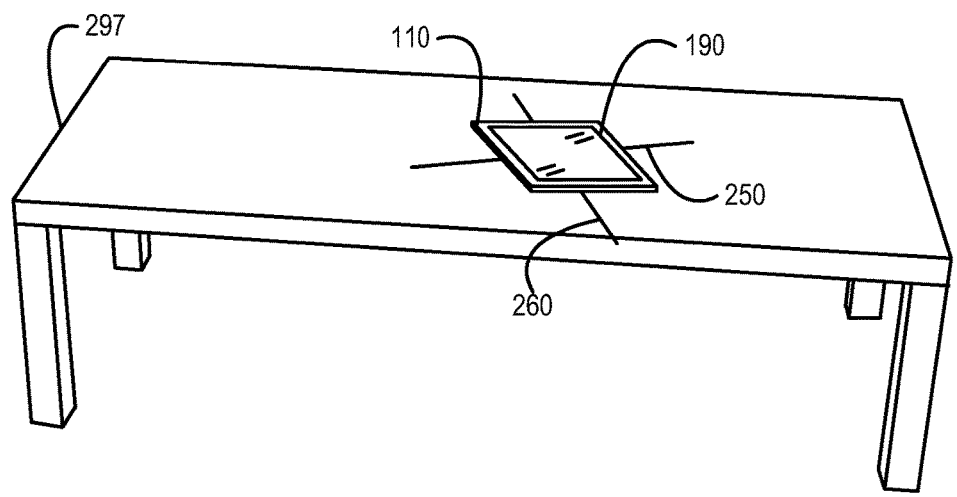

Turning now to FIG. 2H, an example of a privacy area is illustrated, according to one or more embodiments. As shown, display 190 may display a contract 295. For example, contract 296 may include a signature area 296. In one or more embodiments, display 190 may be on a surface for a user to sign contract 295 via signature area 296. For example, IHS 110 may be on a top surface of a table 297, as illustrated. For instance, signature area 296 may be visible, while other one or more portions of contract 295 may not be visible, as illustrated with respect to display 190B.

Figure 3A:
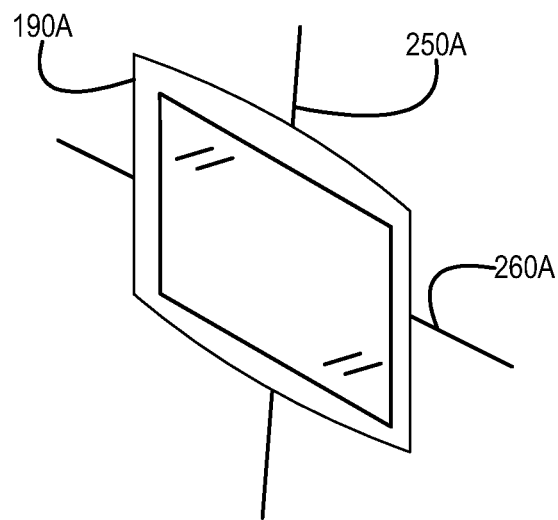
FIGS. 3A-3F illustrates example display devices, according to one or more embodiments.

Turning now to FIGS. 3A-3F, example display devices are illustrated, according to one or more embodiments. With reference to FIG. 3A, display device 190A may be in a landscape mode. In one example, louvers 230 may absorb, diffuse, and/or obscure at least a portion of light emissions of display device 190A when a viewing angle is less than the threshold angle $\theta_T$ or greater than 180-$\theta_T$ with respect to axis 260A. For instance, a person may not be able to decipher information conveyed from display device 190A when a viewing angle is less than the threshold angle $\theta_T$ or greater than 180-$\theta_T$ with respect to axis 260A. In another example, information conveyed via pixels 220 may be decipherable by a person when a viewing angle is greater than the threshold angle $\theta_T$ and less than 180-$\theta_T$ with respect to axis 260A.

Figure 3B:
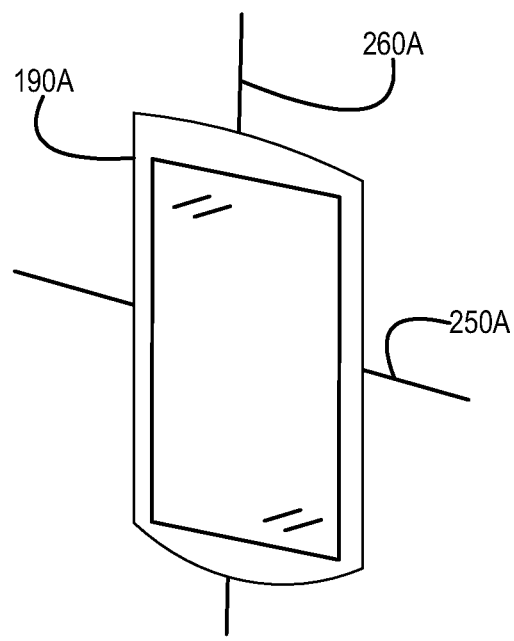

With reference to FIG. 3B, display device 190A may be in a portrait mode. In one example, louvers 240 may absorb, diffuse, and/or obscure at least a portion of light emissions of display device 190A when a viewing angle is less than the threshold angle $\phi_T$ or greater than 180-$\phi_T$ with respect to axis 250A. For instance, a person may not be able to decipher information conveyed from display device 190A when a viewing angle is less than the threshold angle $\phi_T$ or greater than 180-$\phi_T$ with respect to axis 250A. In another example, information conveyed via pixels 220 may be decipherable by a person when a viewing angle is greater than the threshold angle $\phi_T$ and less than 180-$\phi_T$ with respect to axis 250A.

In one or more embodiments, with reference to either of FIGS. 3A and 3B, louvers 230 may absorb, diffuse, and/or obscure at least a portion of light emissions of display device 190A, and louvers 240 may absorb, diffuse, and/or obscure at least another portion of light emissions of display device 190A. For example, louvers 230 may absorb, diffuse, and/or obscure at least a portion of light emissions of display device 190A when a viewing angle is less than the threshold angle $\theta_T$ or greater than 180-$\theta_T$ with respect to axis 260A, and louvers 240 may absorb, diffuse, and/or obscure at least another portion of light emissions of display device 190A when a viewing angle is less than the threshold angle $\phi_T$ or greater than 180-$\phi_T$ with respect to axis 250A. For instance, a person may not be able to decipher information conveyed from display device 190A when a viewing angle is less than the threshold angle $\theta_T$ or greater than 180-$\theta_T$ with respect to axis 260A and/or when a viewing angle is less than the threshold angle $\phi_T$ or greater than 180-$\phi_T$ with respect to axis 250A.

Figure 3C:
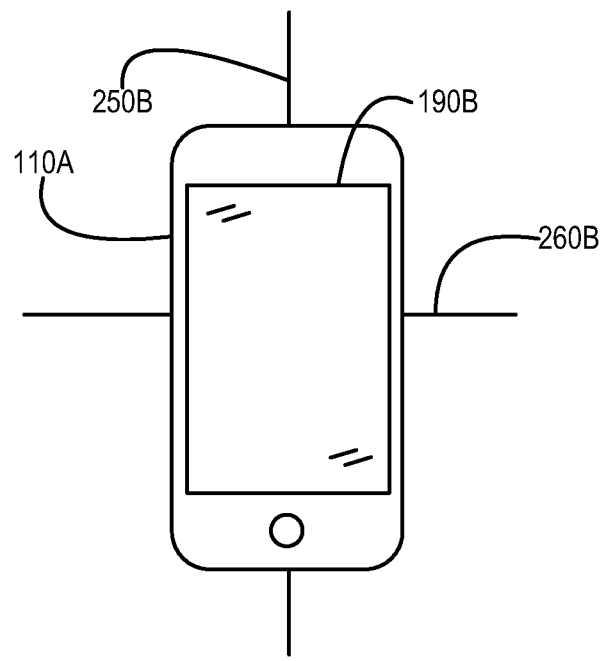

With reference to FIG. 3C, display device 190B may be in a portrait mode. In one or more embodiments, an IHS 110A (e.g., a tablet computing device) may include display device 190B. In one example, louvers 230 may absorb, diffuse, and/or obscure at least a portion of light emissions of display device 190B when a viewing angle is less than the threshold angle $\theta_T$ or greater than 180-$\theta_T$ with respect to axis 260B. For instance, a person may not be able to decipher information conveyed from display device 190B when a viewing angle is less than the threshold angle $\theta_T$ or greater than 180-$\theta_T$ with respect to axis 260B. In another example, information conveyed via pixels 220 may be decipherable by a person when a viewing angle is greater than the threshold angle $\theta_T$ and less than 180-$\theta_T$ with respect to axis 260B.

Figure 3D:
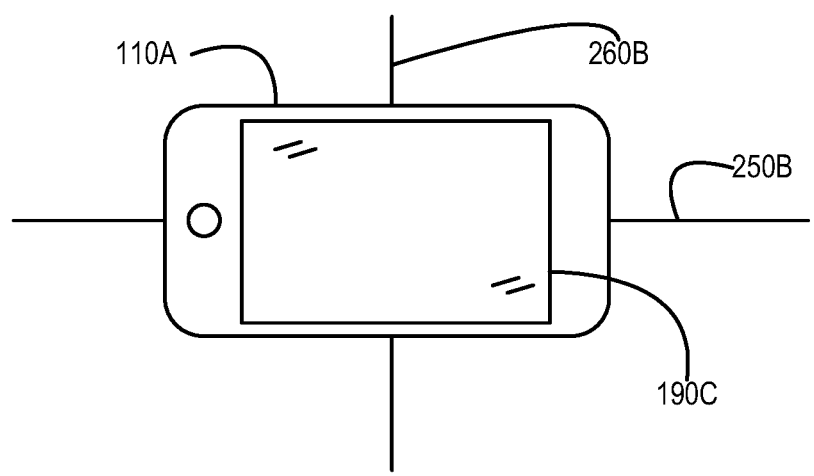

With reference to FIG. 3D, display device 190B may be in a landscape mode. In one example, louvers 240 may absorb, diffuse, and/or obscure at least a portion of light emissions of display device 190B when a viewing angle is less than the threshold angle $\phi_T$ or greater than 180-$\phi_T$ with respect to axis 250B. For instance, a person may not be able to decipher information conveyed from display device 190B when a viewing angle is less than the threshold angle $\phi_T$ or greater than 180-$\phi_T$ with respect to axis 250B. In another example, information conveyed via pixels 220 may be decipherable by a person when a viewing angle is greater than the threshold angle $\phi_T$ and less than 180-$\phi_T$ with respect to axis 250B.

In one or more embodiments, with reference to either of FIGS. 3C and 3D, louvers 230 may absorb, diffuse, and/or obscure at least a portion of light emissions of display device 190B, and louvers 240 may absorb, diffuse, and/or obscure at least another portion of light emissions of display device 190B. For example, louvers 230 may absorb, diffuse, and/or obscure at least a portion of light emissions of display device 190B when a viewing angle is less than the threshold angle $\theta_T$ or greater than 180-$\theta_T$ with respect to axis 260B, and louvers 240 may absorb, diffuse, and/or obscure at least another portion of light emissions of display device 190B and a viewing angle is less than the threshold angle $\phi_T$ or greater than 180-$\phi_T$ with respect to axis 250B. For instance, a person may not be able to decipher information conveyed from display device 190B when a viewing angle is less than the threshold angle $\theta_T$ or greater than 180-$\theta_T$ with respect to axis 260B and/or when a viewing angle is less than the threshold angle $\phi_T$ or greater than 180-$\phi_T$ with respect to axis 250B.

Figure 3E:
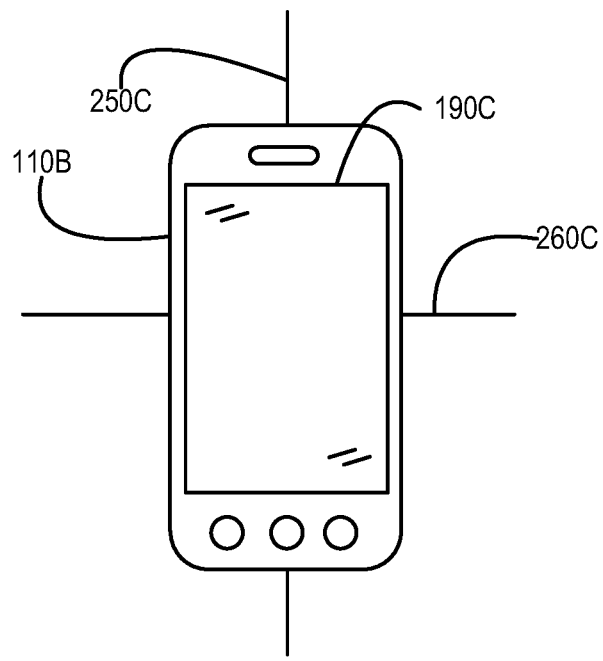

With reference to FIG. 3E, display device 190C may be in a portrait mode. In one or more embodiments, an IHS 110B (e.g., a wireless telephone, a smart phone, a PDA, a digital music player, etc.) may include display device 190C. In one example, louvers 230 may absorb, diffuse, and/or obscure at least a portion of light emissions of display device 190C when a viewing angle is less than the threshold angle $\theta_T$ or greater than 180-$\theta_T$ with respect to axis 260C. For instance, a person may not be able to decipher information conveyed from display device 190C when a viewing angle is less than the threshold angle $\theta_T$ or greater than 180-$\theta_T$ with respect to axis 260C. In another example, information conveyed via pixels 220 may be decipherable by a person when a viewing angle is greater than the threshold angle $\theta_T$ and less than 180-$\theta_T$ with respect to axis 260C.

Figure 3F:
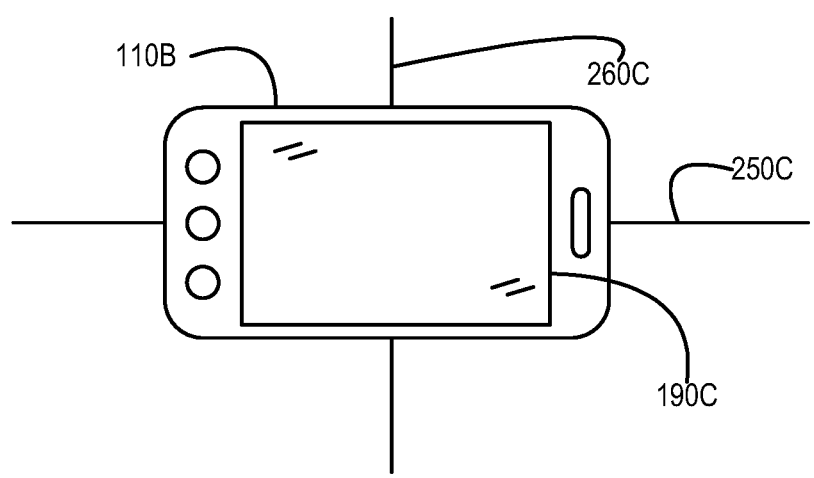

With reference to FIG. 3F, display device 190C may be in a landscape mode. In one example, louvers 240 may absorb, diffuse, and/or obscure at least a portion of light emissions of display device 190C when a viewing angle is less than the threshold angle $\phi_T$ or greater than 180-$\phi_T$ with respect to axis 250C. For instance, a person may not be able to decipher information conveyed from display device 190C when a viewing angle is less than the threshold angle $\phi_T$ or greater than $180-\phi_T$ with respect to axis 250C. In another example, information conveyed via pixels 220 may be decipherable by a person when a viewing angle is greater than the threshold angle $\phi_T$ and less than $180-\phi_T$ with respect to axis 250C.

In one or more embodiments, with reference to either of FIGS. 3E and 3F, louvers 230 may absorb, diffuse, and/or obscure at least a portion of light emissions of display device 190C, and louvers 240 may absorb, diffuse, and/or obscure at least another portion of light emissions of display device 190C. For example, louvers 230 may absorb, diffuse, and/or obscure at least a portion of light emissions of display device 190C when a viewing angle is less than the threshold angle $\theta_T$ or greater than $180-\theta_T$ with respect to axis 260C, and louvers 240 may absorb, diffuse, and/or obscure at least another portion of light emissions of display device 190C when a viewing angle is less than the threshold angle $\phi_T$ or greater than $180-\phi_T$ with respect to axis 250C. For instance, a person may not be able to decipher information conveyed from display device 190C when a viewing angle is less than the threshold angle $\theta_T$ or greater than $180-\theta_T$ with respect to axis 260C and/or when a viewing angle is less than the threshold angle $\phi_T$ or greater than $180-\phi_T$ with respect to axis 250C.

Figure 4A:
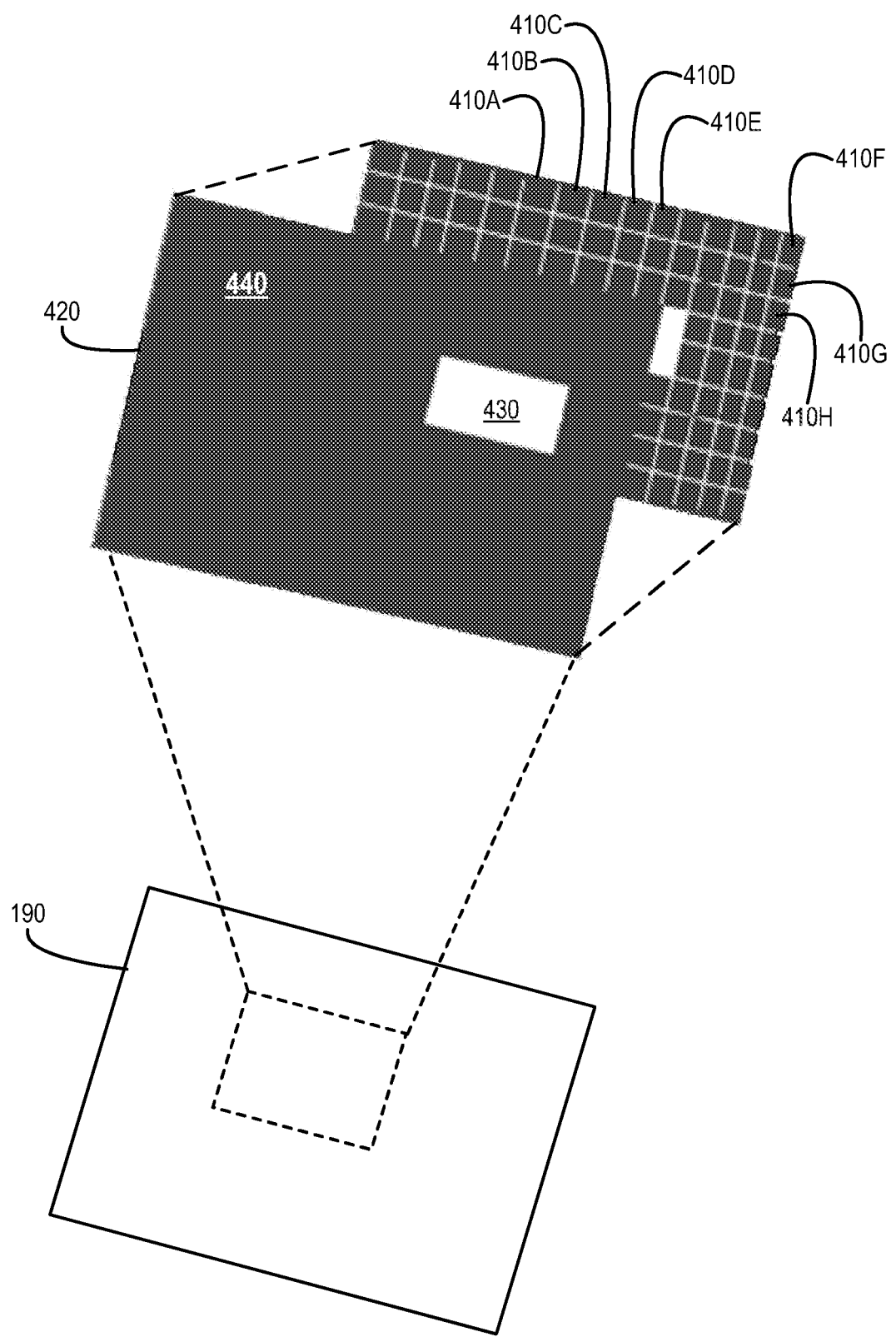
FIG. 4A illustrates an example of louvers and backlight segments of a display, according to one or more embodiments.

Turning now to FIG. 4A, an example of louvers and backlight segments of a display is illustrated, according to one or more embodiments. As shown, display 190 may include backlight segments 410 and louvers 420. In one or more embodiments, louvers 420 may include louvers 230 and 240. As illustrated, louvers 420 may be in front of and/or on top of backlight segments 410. In one or more embodiments, backlight segments 410 may be arranged in a two-dimensional array. For example, backlight segments 410 may be arranged and/or configured via one or more rows and/or columns. For instance, light emitted from backlight segments 410 may be modulated by a accessing individual backlight segments 410 in a row/column fashion. In one or more embodiments, a backlight segment 410 may include one or more devices that are configured to produce light emissions. For example, a backlight segment 410 may include one or more light emitting diodes (LEDs). In one or more embodiments, the one or more LEDs may be modulated to produce one or more intensities of light emissions. In one or more embodiments, no power may be applied to one or more of the one or more LEDs to generate a blank, a black, and/or a dark area of display 190. For example, not applying power to generate a blank, a black, and/or a dark area of display 190 may conserve power. In one instance, not applying power to generate a blank, a black, and/or a dark area of display 190 may conserve stored energy of a battery and/or of a capacitor. In another instance, not applying power to generate a blank, a black, and/or a dark area of display 190 may reduce emissions associated with generating energy and/or power.

In one or more embodiments, illumination of a backlight segment 410 may be controlled. For example, a backlight controller may control an amount of light that is emitted via a backlight segment 410. In one or more embodiments, louvers 420 may be controlled. For example, a louver controller may control louvers 420. As shown, louvers 420 may be controlled to obscure and/or block light emissions in area 440 of display 190. As illustrated, louvers 420 may be controlled to permit light emissions in area 430 of display 190. In one or more embodiments, louvers 420 may be controlled to direct light emissions in area 430 of display 190. In one or more embodiments, backlight segments 410 may produce one or more amounts of illumination for area 430 of display 190. In one or more embodiments, backlight segments 410 may not produce one or more amounts of illumination for area 440 of display 190.

Figure 4B:
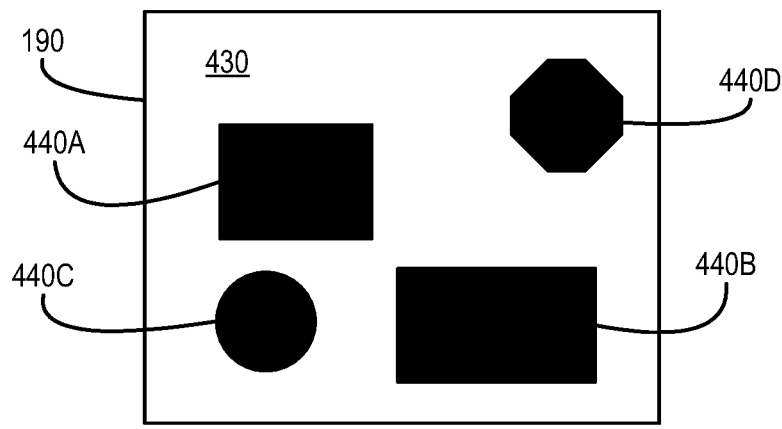
FIGS. 4B and 4C illustrate examples of viewable and non-viewable portions of a display, according to one or more embodiments.
Figure 4B:
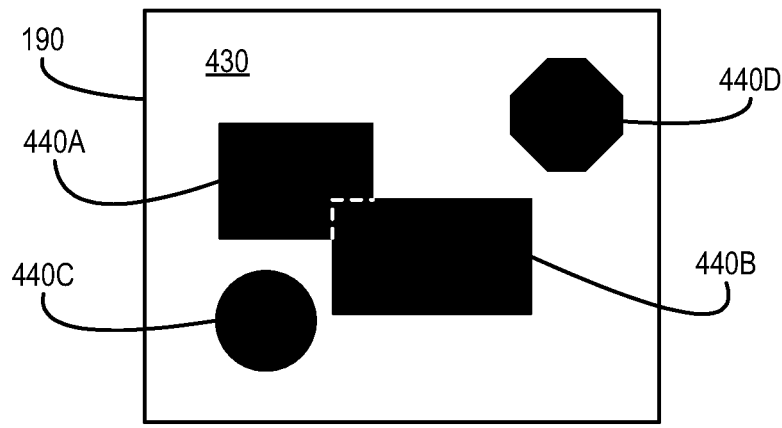
Figure 4B:
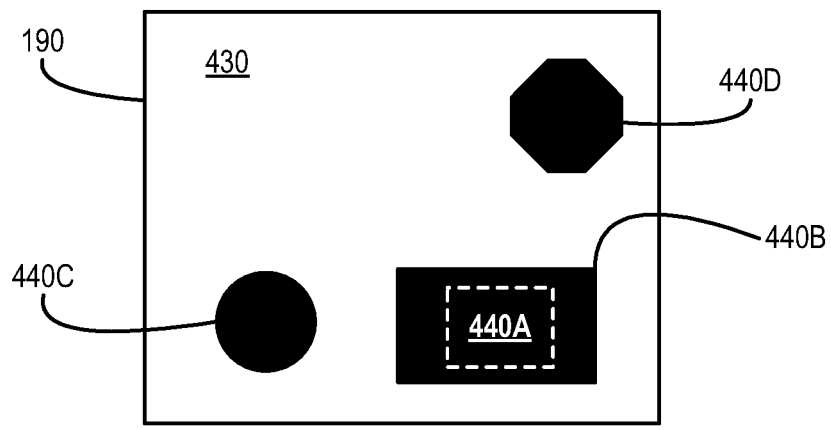
Figure 4C:
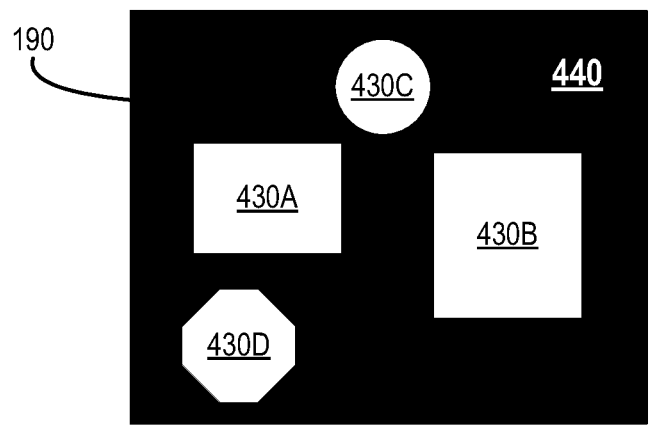
Figure 4C:
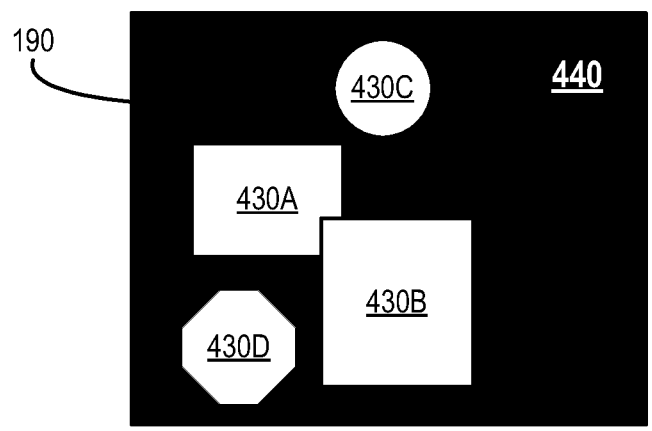
Figure 4C:
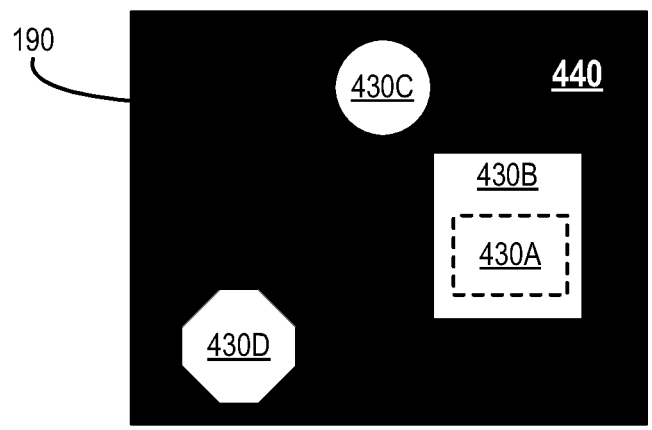

Turning now to FIGS. 4B and 4C, examples of viewable and non-viewable portions of a display are illustrated, according to one or more embodiments. As shown in FIG. 4B, information may not be viewed via a portion 440 of display 190. In one or more embodiments, portions 440 may be of various shapes and/or sizes. For example, backlight segments 410 and louvers 420 may implement one or more of portions 440A-440D. As illustrated, information may be view via portion 430 of display 190. A shown, in FIG. 4C, information may be viewed via a portion 430 of display 190. In one or more embodiments, portions 430 may be of various shapes and/or sizes. For example, backlight segments 410 and louvers 420 may implement one or more of portions 430A-430D. As illustrated, information may not be view via portion 440 of display 190.

In one or more embodiments, one or more of portions 430 and 440 may automatically engage. In one example, an application may automatically engage one or more of portions 430 and 440. In another example, one or more of portions 430 and 440 may be automatically engaged, based at least on content and/or based at least on location. In one instance, the content may include confidential and/or sensitive information (e.g., an image, a contract, a confidential document, audio, a video, etc.). In another instance, it may be determined that IHS 110 is not at a private location (e.g., a home, an office, etc.), and one or more of portions 430 and 440 may be automatically engaged in response to determining that IHS 110 is not at a private location.

In one or more embodiments, one or more portions of backlight segments 410 may be utilized with two different portions 430. For example, one or more portions of backlight segments 410 may be utilized with two different portions 430A and 430B. In one or more embodiments, one or more portions of backlight segments 410 may be utilized with two different portions 440. For example, one or more portions of backlight segments 410 may be utilized with two different portions 440A and 430B. In one or more embodiments, one or more portions of louvers 410 may be utilized with two different portions 430. For example, one or more portions of louvers 410 may be utilized with two different portions 430A and 430B. In one or more embodiments, one or more portions of louvers 410 may be utilized with two different portions 440. For example, one or more portions of louvers 410 may be utilized with two different portions 440A and 430B. In one or more embodiments, at least a portion of louvers 410 utilized with a first portion 430 may be different from at least a portion of louvers 410 utilized with a second portion 430. For example, at least a portion of louvers 410 utilized with portion 430A may be different from at least a portion of louvers 410 utilized with a second portion 430B. In one or more embodiments, at least a portion of louvers 410 utilized with a first portion 440 may be different from at least a portion of louvers 410 utilized with a second portion 440. For example, at least a portion of louvers 410 utilized with portion 440A may be different from at least a portion of louvers 410 utilized with a second portion 440B.

Figure 4D:
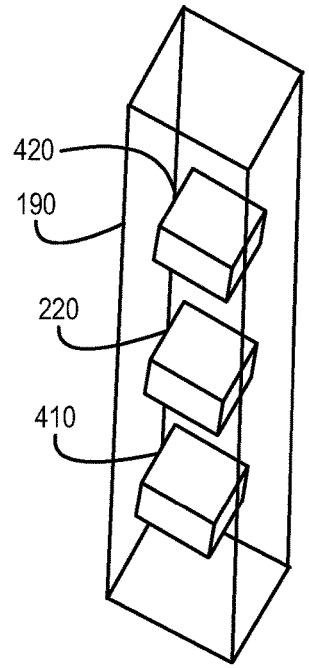
FIG. 4D illustrates an example of a display that includes backlight segments, pixels, and louvers, according to one or more embodiments.

Turning now to FIG. 4D, an example of a display that include backlight segments, pixels, and louvers is illustrated, according to one or more embodiments. As shown, display 190 may include backlight segments 410, pixels 220, and louvers 420. In one example, pixels 220 may be positioned above backlight segments 410. In another example, louvers 420 may be positioned above pixels 220. In one or more embodiments, pixels 220 may modify light emitted from backlight segments 410. For example, modifying light emitted from backlight segments 410 may include modifying one or more colors of light emitted from backlight segments 410. For instance, pixels 220 may filter one or more colors of light emitted from backlight segments 410.

Figure 4E:
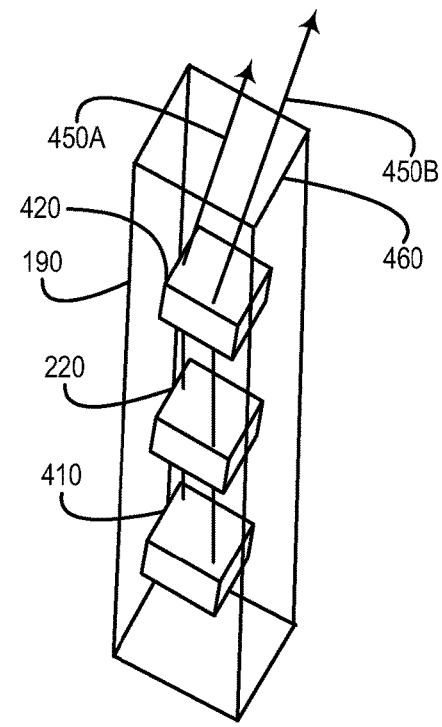
FIG. 4E illustrates an example of light emission, according to one or more embodiments.

Turning now to FIG. 4E, an example of light emission is illustrated, according to one or more embodiments. As shown, light emissions 450 may be produced by backlight segments 410. In one or more embodiments, pixels 220 may color and/or filter light emissions 450. In one or more embodiments, louvers 420 may steer and/or direct light emissions 450. For example, light emissions 450 may be directed and/or steer at an angle with respect to a surface 460 of display 190. For instance, louvers 420 may steer and/or direct light emissions 450 at an angle with respect to a surface 460 of display 190.

Figure 4F:
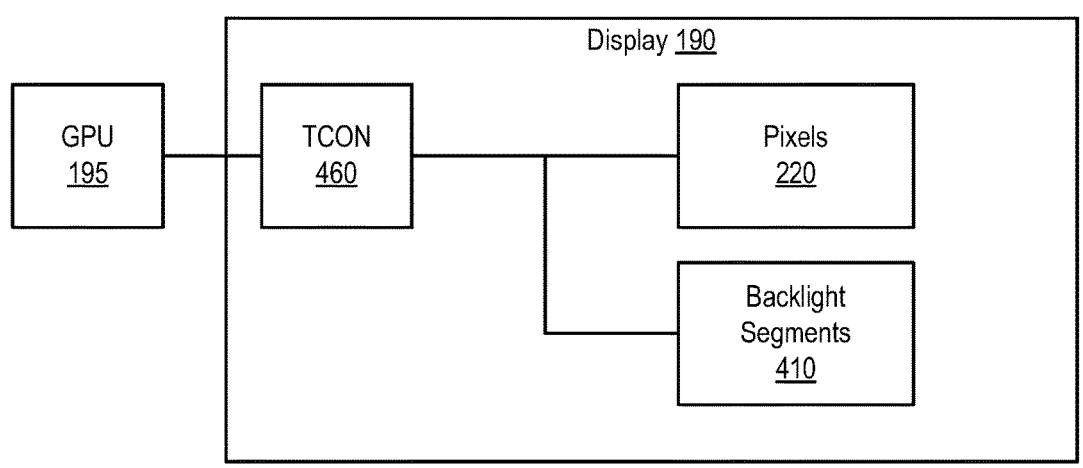
FIG. 4F illustrates an example of a graphics processing unit, a timing controller, and a display, according to one or more embodiments.

Turning now to FIG. 4F, an example of a graphics processing unit, a timing controller, and a display is illustrated, according to one or more embodiments. As shown, GPU 195 may be coupled to a TCON 460. As illustrated, TCON 460 may be coupled to backlight segments 410 and pixels 220. In one or more embodiments, TCON 460 may receive an image from GPU 195 and may provide first information to pixels 220 and second information to backlight segments 410. For example, TCON 460 may control backlight segments based at least on an image from GPU 195.

Figure 5:
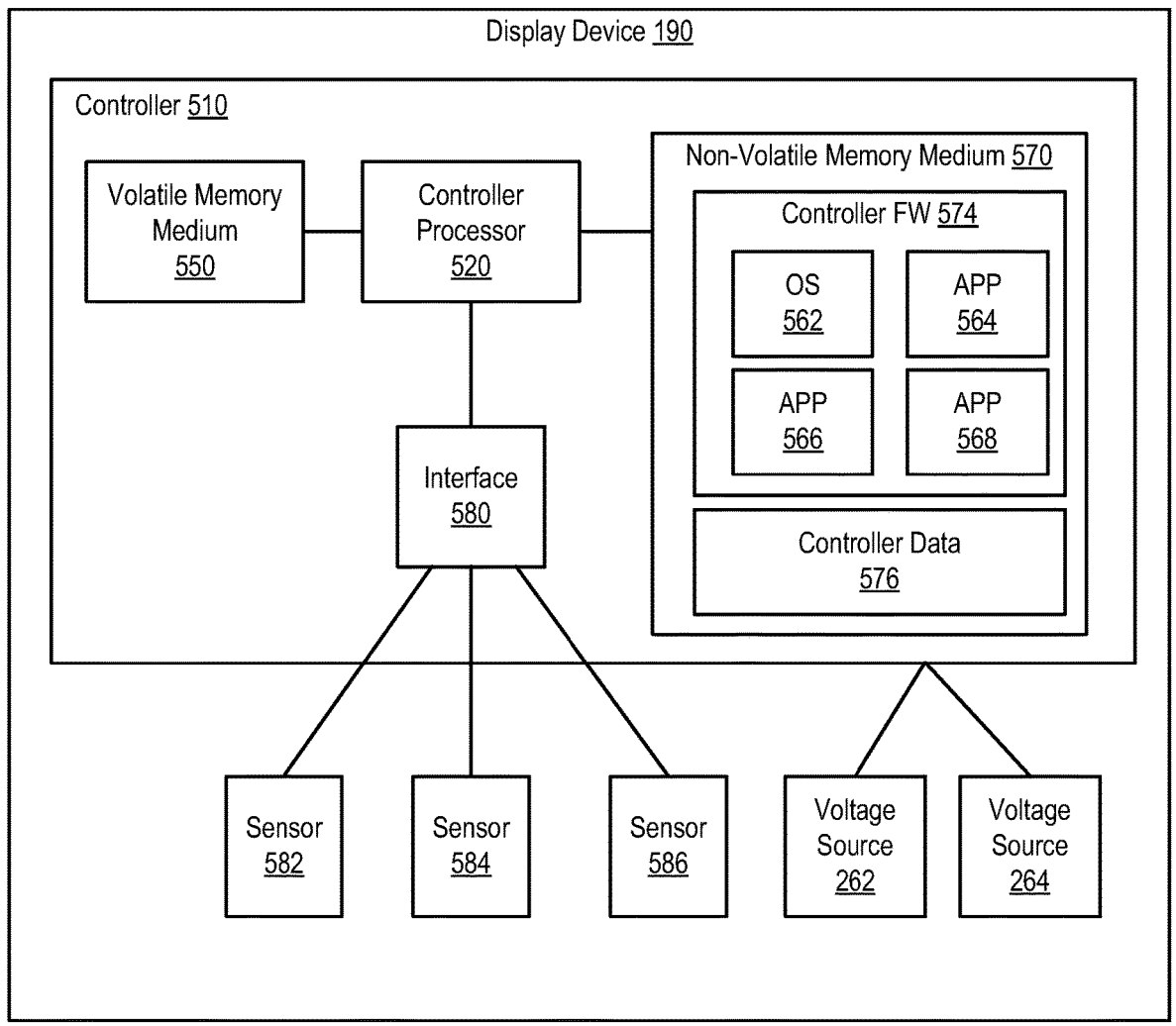
FIG. 5 illustrates an example of an embedded controller and sensors, according to one or more embodiments.

Turning now to FIG. 5, an example of a controller and sensors is illustrated, according to one or more embodiments. As shown, a controller may include a controller processor 520, a volatile memory medium 550, a non-volatile memory medium 570, and an interface 580. As illustrated, non-volatile memory medium 570 may include a controller FW 574, which may include an OS 562 and APPs 564-568, and may include controller data 576. For example, OS 562 may be or include a real time operating system (RTOS).

In one or more embodiments, one or more of OS 562 and APPs 564-568 may include processor instructions executable by controller processor 520. In one example, controller processor 520 may execute processor instructions of one or more of OS 562 and APPs 564-568 via non-volatile memory medium 570. In another example, one or more portions of the processor instructions of the one or more of OS 562 and APPs 564-568 may be transferred to volatile memory medium 550, and controller processor 520 may execute the one or more portions of the processor instructions of the one or more of OS 562 and APPs 564-568 via volatile memory medium 550.

In one or more embodiments, controller processor 520 may utilize controller data 576. In one example, controller processor 520 may utilize controller data 576 via non-volatile memory medium 570. In another example, one or more portions of controller data 576 may be transferred to volatile memory medium 550, and controller processor 520 may utilize controller data 576 via volatile memory medium 550.

As illustrated, display device 190 may include controller 510 and one or more of sensors 582-586. In one or more embodiments, one or more of sensors 582-586 may be coupled to controller 510. For example, one or more of sensors 582-586 may be coupled to an interface 580 of controller 510. In one or more embodiments, interface 580 may be or include a sensor hub. In one or more embodiments, interface 580 may include one or more of an I²C interface, a SPI interface, a USB interface, a general purpose input/output (GPIO) interface, and a universal asynchronous receiver-transmitter (UART) interface, among others. In one or more embodiments, sensors 582-586 may include one or more structures and/or functionalities as those described with reference to respective sensors 182-186. For example, controller processor 520 may receive data from one or more of sensors 582-586. For instance, controller processor 520 may receive data from one or more of sensors 582-586 via interface 580.

In one or more embodiments, controller 510 may be coupled to IHS 110. For example, controller 510 may receive and/or provide information from and/or to IHS 110. In one or more embodiments, controller 510 may control louvers 230 and 240 based at least on information received from one or more of sensors 582-586 and IHS 110, among others. In one or more embodiments, controller 510 may control backlight segments 410 based at least on information received from one or more of sensors 582-586 and IHS 110, among others.

As shown, voltage sources 262 and 264 may be coupled to controller 510. In one or more embodiments, one or more of controller 510 and controller processor 520 may control one or more of voltage sources 262 and 264. In one or more embodiments, one or more of IHS 110 and processor 120 may control one or more of voltage sources 262 and 264 via one or more of controller 510 and controller 520. In one or more embodiments, one or more of voltage sources 262 and 264 may control one or more angles $\omega_1$, $\omega_2$, an $d\omega_3$ (e.g., see FIG. 2G), among others.

In one or more embodiments, circuitry of display 190 may be or include controller 510, among others. For example, the circuitry of display 190 may be coded and/or configured in accordance with one or more flowcharts, systems, methods, and/or processes described herein. In one or more embodiments, the circuitry of display 190 may include TCON 460, among others.

Figure 6:
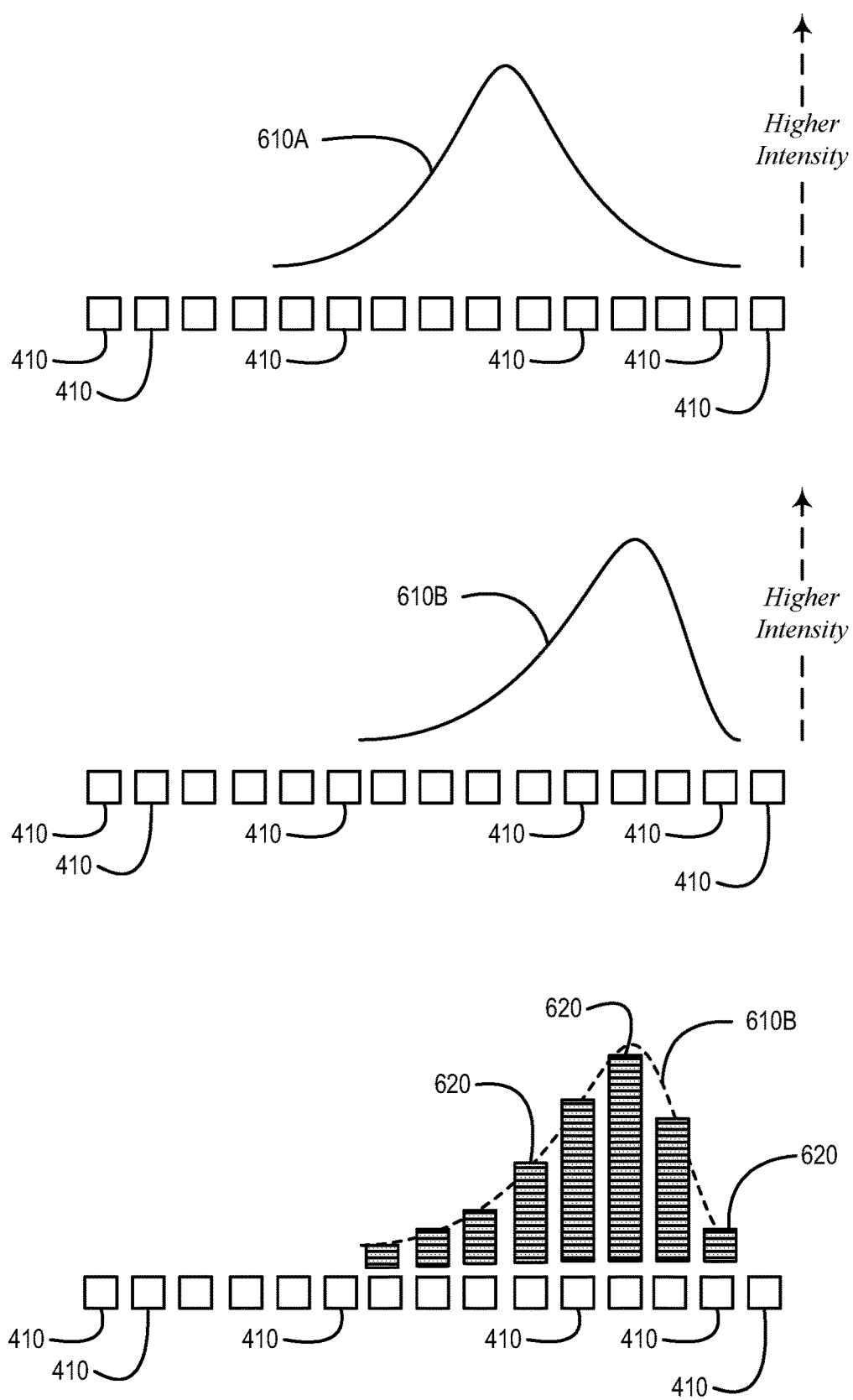
FIG. 6 illustrates examples of intensities of light emissions, according to one or more embodiments.

Turning now to FIG. 6, examples of intensities of light emissions are illustrated, according to one or more embodiments. As shown, a curve 610A may represent intensities of light emissions from backlight segments 410. In one or more embodiments, light emission 450 may be associated with light intensities represented by curve 610A. As illustrated, a curve 610B, may represent intensities of light emissions from backlight segments 410. In one or more embodiments, light emission 450 may be associated with light intensities represented by curve 610B. For example, light emission 450 may be associated with light intensities represented by curve 610B may be utilized with louvers 420 in steering and/or directing light emission 450, as illustrated in FIG. 4E. As shown, intensities 620 may be associated with discrete backlight segments 410. For example, intensities 620 may discretely approximate curve 610B. For instance, backlight segments 410 may generate light emissions that approximate an asymmetrical intensity curve (e.g., curve 610B).

In one or more embodiments, intensities 620 may be generated in response to determining a position of a user. For example, IHS 110 may determine a position of a user. In one instance, a camera associated with IHS 110 may be utilized in determining a position of a user. In another instance, IHS 110 may include a camera, and the camera may be utilized in determining a position of a user. In one or more embodiments, a user positioned where one or more intensities 620 are less intensive, discerning information from display 190 may be more difficult. In one or more embodiments, backlight segments 410, as illustrated in FIG. 6, may be a cross section of a two-dimensional array of backlight segments of display 190. In one or more embodiments, louvers may also create an intensity shape. For example, louvers 230 and 240 may create an intensity shape in conjunction with backlight segments 410, which may modulate light emissions. In one or more embodiments, intensities 620 may be generated via light emissions from backlight segments 410 that are modulated. For example, TCON 460 may modulate backlight segments 410 to create intensities 620 of light emissions.

Figure 7:
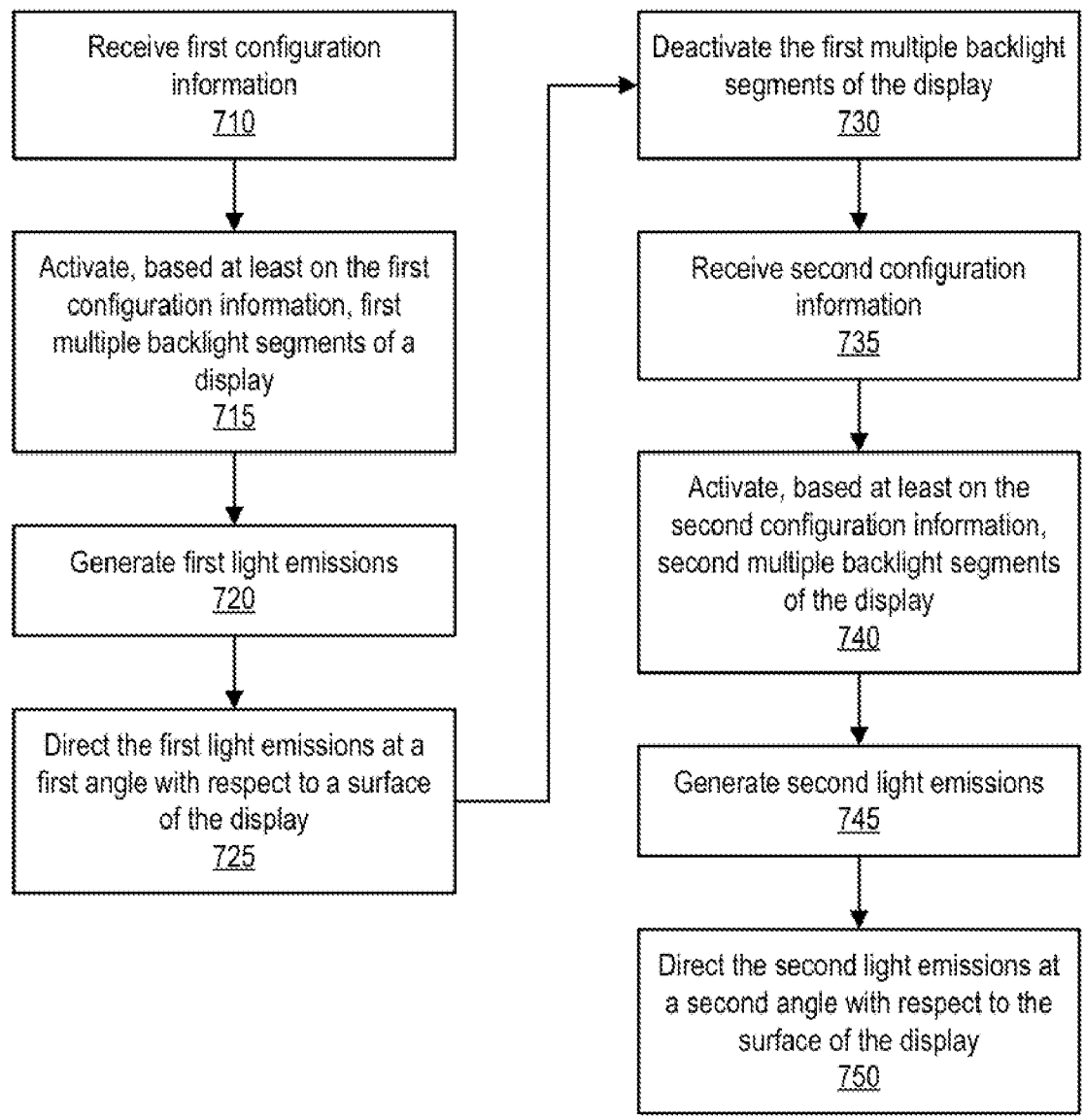
FIG. 7 illustrates an example method of operating a display, according to one or more embodiments.

Turning now to FIG. 7, an example method of operating a display is illustrated, according to one or more embodiments. At 710, first configuration information may be received. In one or more embodiments, the first configuration information may include information that indicates a privacy area of a display. In one example, the first configuration information may be received from an application. In one instance, the application may generate the first configuration information based on content (e.g., a file, an image, a video, etc.). In another instance, the application may generate the first configuration information based on user input (e.g., one or more user selectable privacy areas of the application). In another example, the first configuration information may be received from an OS (e.g., OS 162). In one instance, the OS may be configured to provide one or more privacy areas based on an application type. In another instance, the OS may be configured to provide one or more privacy areas based user input (e.g., from a user configuration of the OS).

At 715, first multiple backlight segments of the display may be activated based at least on the first configuration information. In one or more embodiments, the first multiple backlight segments may be activated while other backlight segments are not activated. For example, the first multiple backlight segments that are activated may be associated with viewable area of the display, while other backlight segments may not be activated. In one instance, the first multiple backlight segments that are activated may be associated with an area 430. In another instance, the other backlight segments that may not be activated may be associated with an area 440.

At 720, the first multiple backlight segments of the display may generate first light emissions. For example, the first multiple backlight segments associated with an area 430 may generate the first light emissions. At 725, the first light emissions may be directed. For example, louvers may direct the first light emissions at a first angle with respect to the display. For instance, louvers 230 and/or louvers 240 may direct the first light emissions. In one or more embodiments, first louvers may direct the first light emissions at a first angle with respect to the display.

At 730, the first multiple backlight segments of the display may be deactivated. At 735, second configuration may be received. In one or more embodiments, the configuration information may include information that indicates a privacy area of a display. In one example, the second configuration information may be received from an application. In one instance, the application may generate the second configuration information based on content (e.g., a file, an image, a video, etc.). In another instance, the application may generate the second configuration information based on user input (e.g., one or more user selectable privacy areas of the application). In another example, the second configuration information may be received from an OS (e.g., OS 162). In one instance, the OS may be configured to provide one or more privacy areas based on an application type. In another instance, the he OS may be configured to provide one or more privacy areas based user input (e.g., from a user configuration of the OS).

At 740, the second multiple backlight segments of the display may generate second light emissions. In one or more embodiments, at least a portion of the second backlight segments may be different from at least a portion of the first backlight segments. For example, the second multiple backlight segments associated with another area 430 may generate the second light emissions. At 745, the second backlight segments of the display generating second light emissions. For example, the second multiple backlight segments associated with the other area 430 may generate the first light emissions.

At 750, the second light emissions may be directed. For example, louvers may direct the second light emissions at a second angle with respect to the display. For instance, louvers 230 and/or louvers 240 may direct the second light emissions. In one or more embodiments, the second angle may be different from the first angle. In one or more embodiments, second louvers may direct the second light emissions at a second angle with respect to the display. In one or more embodiments, at least a portion of the second louvers may be different from at least a portion of the first louvers.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:
1. A display device, comprising:
   backlight segments configured to emit light;
   louvers configured to direct light emitted from the backlight segments along two axes of the display device; and
   circuitry configured to:
      receive first configuration information;
      determine a position of a user with respect to the display;
      activate, based at least on the first configuration information, a first plurality of the backlight segments;
      generate, via the first plurality of the backlight segments, first light emissions that approximate an asymmetrical intensity curve based at least on the position of the user with respect to the display;

direct, via a first plurality of the louvers, the first light emissions at a first angle with respect to a surface of the display;
deactivate the first plurality of the backlight segments;
receive second configuration information;
activate, based at least on the second configuration information, a second plurality of the backlight segments of the display, wherein at least a portion of the second plurality of the backlight segments is different from at least a portion of the first plurality of the backlight segments;
generate, via the second plurality of the backlight segments, second light emissions; and
direct, via a second plurality of the louvers, the second light emissions at a second angle, different from the first angle, with respect to the surface of the display.

2. The display of claim 1, wherein, to receive the first configuration information, the circuitry is further configured to receive the first configuration information from at least one of an application and an operating system.

3. The display of claim 2,
wherein the at least one of the application and the operating system includes the application; and
wherein the application determines the first configuration information based at least on content accessed by the application.

4. The display of claim 1, wherein at least a portion of the second plurality of louvers is different from a portion of the first plurality of louvers.

5. The display of claim 1,
wherein the circuitry includes a timing controller; and
wherein, to activate the first plurality of the backlight segments, the timing controller is configured to:
receive an image from a graphics processing unit; and
activate the first plurality of backlight segments.

6. A method, comprising:
receiving first configuration information;
determining a position of a user with respect to a display;
activating, based at least on the first configuration information, a first plurality of backlight segments of the display;
the first plurality of backlight segments of the display generating first light emissions that approximate an asymmetrical intensity curve based at least on the position of the user with respect to the display;
a first plurality of louvers directing the first light emissions at a first angle with respect to a surface of the display;
deactivating the first plurality of backlight segments of the display;
receiving second configuration information;
activating, based at least on the second configuration information, a second plurality of backlight segments of the display, wherein at least a portion of the second plurality of backlight segments is different from at least a portion of the first plurality of backlight segments;
the second plurality of backlight segments of the display generating second light emissions; and
a second plurality of louvers directing the second light emissions at a second angle, different from the first angle, with respect to the surface of the display.

7. The method of claim 6, wherein the receiving the first configuration information includes receiving the first configuration information from at least one of an application and an operating system.

8. The method of claim 7,
wherein the at least one of the application and the operating system includes the application; and
wherein the application determines the first configuration information based at least on content accessed by the application.

9. The method of claim 6, wherein at least a portion of the second plurality of louvers is different from a portion of the first plurality of louvers.

10. The method of claim 6, wherein the activating, based at least on the first configuration information, the first plurality of backlight segments of the display includes:
a timing controller receiving an image from a graphics processing unit; and
the timing controller activating the first plurality of backlight segments.

11. An information handling system, comprising:
a display that includes backlight segments configured to emit light and louvers configured to direct light emitted from the backlight segments along two axes of the display device; and
circuitry configured to:
receive first configuration information;
determine a position of a user with respect to the display;
activate, based at least on the first configuration information, a first plurality of the backlight segments;
generate, via the first plurality of the backlight segments, first light emissions that approximate an asymmetrical intensity curve based at least on the position of the user with respect to the display;
direct, via a first plurality of the louvers, the first light emissions at a first angle with respect to a surface of the display;
deactivate the first plurality of the backlight segments;
receive second configuration information;
activate, based at least on the second configuration information, a second plurality of the backlight segments of the display, wherein at least a portion of the second plurality of the backlight segments is different from at least a portion of the first plurality of the backlight segments;
generate, via the second plurality of the backlight segments, second light emissions; and
direct, via a second plurality of the louvers, the second light emissions at a second angle, different from the first angle, with respect to the surface of the display.

12. The information handling system of claim 11, wherein, to receive the first configuration information, the circuitry is further configured to receive the first configuration information from at least one of an application and an operating system.

13. The information handling system of claim 12,
wherein the at least one of the application and the operating system includes the application; and
wherein the application determines the first configuration information based at least on content accessed by the application.

14. The information handling system of claim 11,
wherein the circuitry includes a timing controller; and
wherein, to activate the first plurality of the backlight segments, the timing controller is configured to:
receive an image from a graphics processing unit; and
activate the first plurality of backlight segments.

15. The information handling system of claim 11, wherein at least a portion of the second plurality of louvers is different from a portion of the first plurality of louvers.

* * * * *